United States Patent [19]
Holliman et al.

[11] Patent Number: 6,075,557
[45] Date of Patent: Jun. 13, 2000

[54] IMAGE TRACKING SYSTEM AND METHOD AND OBSERVER TRACKING AUTOSTEREOSCOPIC DISPLAY

[75] Inventors: Nicholas Steven Holliman, Wallingford; Qi He Hong, Abingdon; David Ezra, Wallingford; Graham John Woodgate, Henley-on-Thames, all of United Kingdom

[73] Assignee: Sharp Kabushiki Kaisha, Osaka, Japan

[21] Appl. No.: 09/061,690

[22] Filed: Apr. 16, 1998

[30] Foreign Application Priority Data

Apr. 17, 1997 [GB] United Kingdom .................. 9707782

[51] Int. Cl.⁷ ............................................ H04N 13/04
[52] U.S. Cl. ............................ 348/51; 348/169; 351/237; 359/630
[58] Field of Search .................. 348/51, 56, 59, 348/60, 54, 169, 170; 351/237, 246; 359/463, 465, 630; 382/117, 103, 173; H04N 13/04

[56] References Cited

U.S. PATENT DOCUMENTS

| | | | |
|---|---|---|---|
| 3,828,122 | 8/1974 | McPhee et al. | 178/6.8 |
| 4,975,960 | 12/1990 | Petajan | 381/43 |
| 5,016,282 | 5/1991 | Tomono et al. | 382/2 |
| 5,323,470 | 6/1994 | Kara et al. . | |
| 5,349,379 | 9/1994 | Eichenlaub | 348/59 |
| 5,712,732 | 1/1998 | Street | 359/630 |
| 5,726,800 | 3/1998 | Ezra et al. | 359/466 |
| 5,771,121 | 7/1998 | Hentschke | 348/51 |
| 5,777,720 | 7/1998 | Shapiro et al. | 351/237 |

FOREIGN PATENT DOCUMENTS

| | | |
|---|---|---|
| 0579319 | 1/1994 | European Pat. Off. . |
| 0602934 | 6/1994 | European Pat. Off. . |
| 0656555 | 6/1995 | European Pat. Off. . |
| 0726482 | 8/1996 | European Pat. Off. . |
| 0769881 | 4/1997 | European Pat. Off. . |
| 1605201 | 5/1983 | United Kingdom . |
| 2317291 | 3/1998 | United Kingdom . |
| 9618925 | 6/1996 | WIPO . |

OTHER PUBLICATIONS

G. J. Woodgate et al.; U.S. application No. 08/863,086; Filed on May 23, 1997.
D. Ezra et al.; U.S. application No. 08/546,510; Filed on Oct. 20, 1995.
G. J. Woodgate et al.; U.S. application No. 08/592,563; Filed on Jan. 26, 1996.
L. S. Shapiro et al.; U.S. application No. 08/733,623; Filed on Oct. 17, 1996.
Search Report for Application No. GB 9707782.0; Dated Jul. 9, 1997.
T. S. Jebara et al.; MIT Media Laboratory, Perceptual Computing Technical Report #401; 1996; "Parametrized Structure from Motion of 3D Adaptive Feedback Tracking of Faces".
N. Oliver et al.; MIT Media Laboratory Perceptual Computing Section Technical Report No. 396, 1997; "LAFTER: Lips and Face Real Time Tracker".
A. Azarbayejani et al.; MIT Media Laboratory Perceptual Computing Section Technical Report No. 374, 1996; "Real-Time 3-D Tracking of the Human Body".
A. P. Pentland; Scientific American; vol. 274, No. 4, pp. 68–76, 1996, "Smart Rooms".

(List continued on next page.)

*Primary Examiner*—Chris S. Kelley
*Assistant Examiner*—Gims S. Philippe
*Attorney, Agent, or Firm*—Renner, Otto, Boisselle & Sklar

[57] ABSTRACT

An image tracking system which is configured to present a sequence of images, determine the position of a target image in a previously presented image, determine movement of the target image between the previously presented image and a subsequently presented image, and indicate the position of the target image in the subsequently presented image as the aforementioned determined position modified by the determined movement.

28 Claims, 24 Drawing Sheets

OTHER PUBLICATIONS

A. Suwa et al.; IEEE Workshop on Visual Signal Processing and Communications; 1993; "A Video Quality Improvement Technique for Videophone and Videoconference Terminal".

R. Brunelli et al.; IEEE Trans on Pattern Analysis and Machine Intelligence; vol. 15; No. 10; 1993; "Face Recognition: Features Versus Templates".

Origin Instruments; Tthe DynaSight Sensor—User Manual–; 1993.

Origin Instruments; The DynaSight Sensor—Developer Manual.

ISCAN; Eye Point of Regard Analysis Lab.

HHI; The HHI on the Digital Media World; 1996.

European Search Report for Application No. 98302989.3–1238 dated Nov. 17, 1999.

Image to be searched

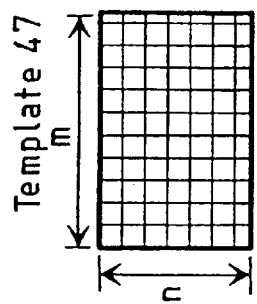
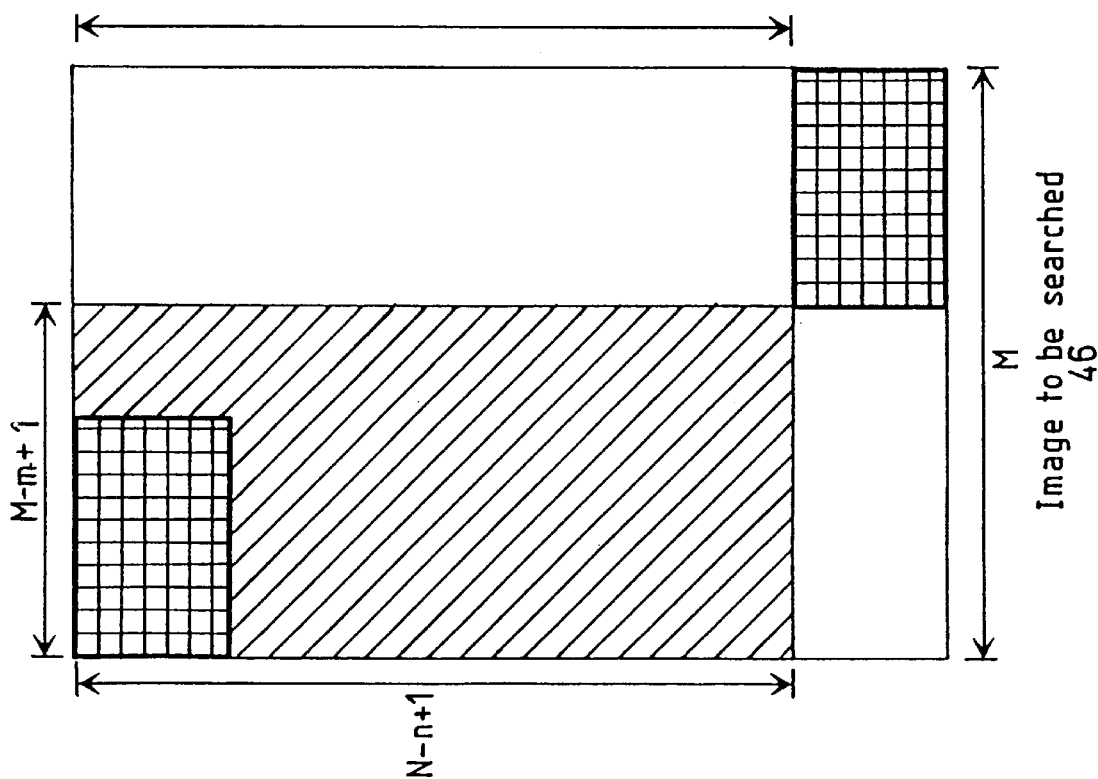
FIG. 14

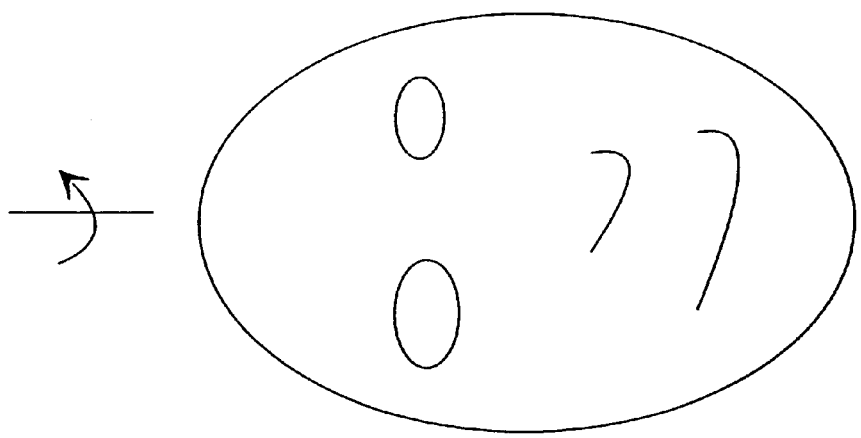
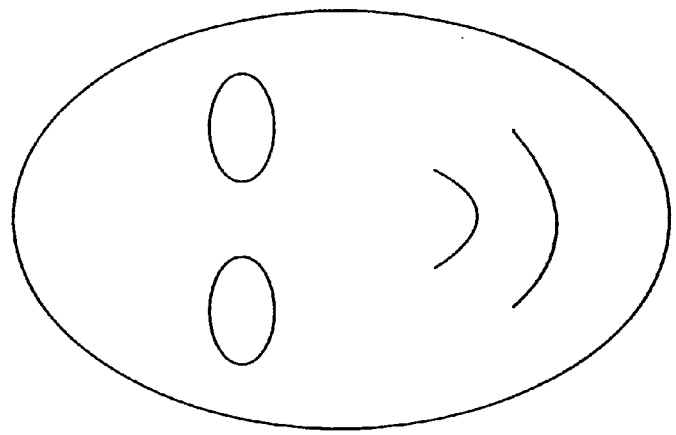
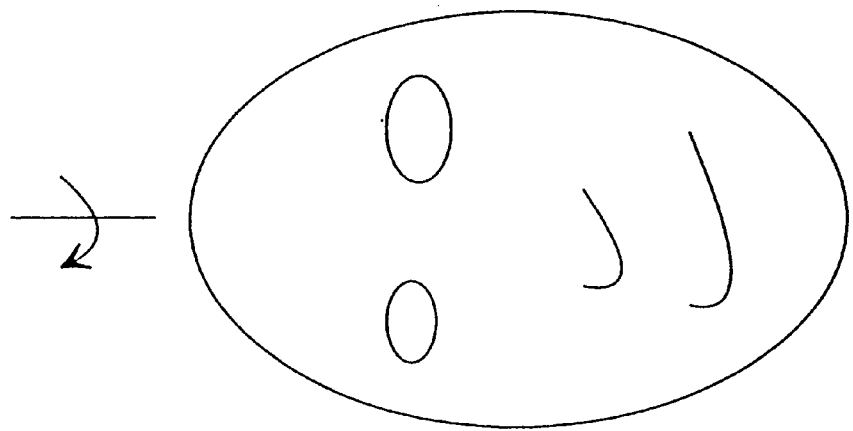
FIG. 28

IMAGE TRACKING SYSTEM AND METHOD AND OBSERVER TRACKING AUTOSTEREOSCOPIC DISPLAY

TECHNICAL FIELD OF THE INVENTION

The present invention relates to an image tracking system and method. The present invention also relates to an observer tracking autostereoscopic display in which such a system and method may be used. The system and method may also be used in other applications, such as security surveillance, video and image compression, video conferencing, computer games, driver monitoring, graphical user interfaces, camera auto-focus systems and multimedia.

BACKGROUND OF THE INVENTION

Autostereoscopic displays are well known and examples are disclosed in EP 0 602 934, EP 0 656 555, EP 0 708 351, EP 0 726 482 and GB 9619097.0. FIG. 1 of the accompanying drawings illustrates schematically the basic components of a typical autostereoscopic display. The display comprises a display system 1 and a tracking system 2. The tracking system 2 comprises a tracking sensor 3 which supplies a sensor signal to a tracking processor 4. The tracking processor derives from the sensor signal an observer position data signal which is supplied to a display control processor 5 of the display system 1. The processor 5 converts the position data signal into a window steering signal and supplies this to a steering mechanism 6 which cooperates with a display 7 such that an observer 8 can view the display autostereoscopically throughout an extended range of observer positions.

FIG. 2 of the accompanying drawings illustrates, purely by way of example, part of a display system 1 including the display 7 and the steering mechanism 6. The steering mechanism comprises a light source 10 which comprises a linear array of individually controllable light emitting elements. A beam splitter 11 such as a partially silvered mirror transmits light from the light source 10 to a mirror 12 and reflects light from the light source 10 to another mirror 13. Light reflected by the mirror 12 passes through a lens 14 and is modulated by a spatial light modulator (SLM) in the form of a liquid crystal device (LCD) 15 with the right eye image of a stereoscopic pair. Similarly, light reflected by the mirror 13 passes through a lens 16 and is spatially modulated by an LCD 17 with a left eye image of the stereoscopic pair. A beam combiner 18, for instance in the form of a partially silvered mirror, reflects light from the LCD 15 to a viewing window 19 for the right eye of the observer 8. Light from the LCD 17 is transmitted by the beam combiner 18 and forms a viewing window 20 for the left eye of the observer 8. The width of each of the viewing windows 19 and 20 is large enough to cover all possible eye separations and typical values of eye separation are from 55 to 70 millimeters. As shown in FIG. 3, the three dimensional (3D) space containing the display 7 and the observer 8 may be described in terms of Cartesian coordinates where X represents the lateral direction, Y represents the vertical direction and Z represents the longitudinal direction. As illustrated in FIG. 4a of the accompanying drawings, diamond-shaped regions 21 and 22 of illumination are formed such that, if the right eye of the observer remains within the region 21 and the left eye of the observer remains with the region 22, a 3D image is perceived across the whole of the display 7. These diamond-shaped regions are referred to as viewing zones and are widest at a "best viewing" window plane 23 which contains the viewing windows 19 and 20. The viewing zones 21 and 22 illustrate the theoretical longitudinal viewing freedom for the display 7.

In order to extend the viewing freedom of the observer, as described hereinbefore, observer tracking and control of the display may be provided. The positions of the viewing windows 19 and 20 are "steered" to follow movement of the head of the observer so that the eyes of the observer remain within the appropriate viewing zones. An essential part of such a display is the tracking system 2 which locates the position of the head and/or eyes of the observer. In effect, it is generally only necessary to track the centre point between the eyes of the observer because this is the position where the left and right viewing windows meet, as shown in the left part of FIG. 4b. Even for relatively large head rotations as shown in the right part of FIG. 4b, such a system accurately positions the viewing windows 19 and 20 so as to maintain autostereoscopic viewing.

Each viewing window has a useful viewing region which is characterised by an illumination profile in the plane 23 as illustrated in FIG. 5 of the accompanying drawings. The horizontal axis represents position in the plane 23 whereas the vertical axis represents illumination intensity. The ideal illumination profile would be rectangular with the adjacent window profiles exactly contiguous. However, in practice, this is not achieved.

As shown in FIG. 5, the width of the window is taken to be the width of the illumination profile at half the maximum average intensity. The profiles of the adjacent viewing windows are not exactly contiguous but have an underlap (as shown) or an overlap. There is variation in uniformity for the "top" of the profile, which represents the useful width. Outside the useful width, the intensity does not fall to zero abruptly but declines steeply to define an edge width. The profile does not reach zero intensity immediately but overlaps with the adjacent profile to give rise to cross talk. The differences between the ideal rectangular illumination profile and the actual profile result from a combination of degradation mechanisms including aberrations in optical systems, scatter, defocus, diffraction and geometrical errors in optical elements of the display. One of the objects of the tracking system 2 is to keep the eyes of the observer within the best viewing regions at all times. Ideally, the viewing windows 19 and 20 should be able to move continuously. However, in practice, the viewing windows may move in discrete steps between fixed positions. The steering mechanism 6 controls the movement or switching of the light source 10 so as to control the viewing window positions. The number of positions and the time required to switch between these positions vary with different displays and steering mechanisms. FIG. 6 of the accompanying drawings illustrates an example of the range of viewing window positions achievable for a display of the type shown in FIG. 2 where the light source 10 comprises fourteen contiguous illuminators and each viewing window has a width determined by four illuminators. This gives rise to eleven possible positions for the viewing window and a typical position is illustrated at 25. Each illuminator is imaged to a strip or "step" such as 26 in the window plane 23 having a width of 16 millimeters with four contiguous strips providing a window width of 64 millimeters. The tracking system 2 attempts to keep the pupil of the eye of the observer in the middle two strips as illustrated at 27. Before the viewer moves one step laterally away from the centre of the region 27, the tracking system 2 illuminates the next strip 26 in the direction of movement and extinguishes the opposite or trailing strip.

In order to match the position data obtained by the tracking system 2 to the display window positions, a calibration process is required, for instance as disclosed in EP 0 769 881. A typical display 7 provides viewing zones in the shape of cones or wedges, such as 28 as shown in FIG. 7 of the accompanying drawings, which emanate from a common origin point referred to as the optical centre 29 of the display. The viewing zones determine the positions at which switching must take place whenever the centre of the two eyes of the observer moves from one window position to another. In this case, the viewing zones are angularly spaced in the horizontal plane specified by the lateral direction (X) and the longitudinal direction (Z) of the observer with respect to the display.

An ideal tracking and display system would respond to any head movement instantaneously. In practice, any practical tracking and display system always requires a finite time, referred to as the system response time, to detect and respond to head movement. When there is only a finite number of steps for moving the viewing windows, an instant response may not be necessary. The performance requirements of the tracking system are then related to the distance an observer can move his eyes before the position of the viewing windows needs to be updated.

For the autostereoscopic display illustrated in FIG. 2 producing the window steps illustrated in FIG. 6, the observer can move by a distance d equivalent to one step before the system needs to respond and update the window position. The distance d and the maximum speed v of observer head movement determine the required system response time t of the tracking system such that $$t=d/v$$

Normal head speed for an average observer is less than 300 millimeters per second but it is not unusual for the observer to move at higher speeds. This happens most often when the observer responds to sudden movement of objects in the displayed stereo image. A typical maximum head speed is about 500 millimeters per second. At this speed, with a typical value of d being 16 millimeters, the tracking and display systems have approximately 32 milliseconds in which to detect and respond to the observer head movements. If this response time is not achieved, the observer may see unpleasant visual artefacts such as flicker. FIG. 8 of the accompanying drawings illustrates at 30 the required system response time in milliseconds as a function of maximum head speed in millimeters per second.

In practice, the actual response time of the tracking and display system includes not only the time required for determining the position of the observer but also the communication time needed to pass this information to the steering mechanism and the time required to switch between the current window position and the next window position.

The required system response time is further reduced by the accuracy of the tracking system. The effect of measuring error is equivalent to a reduction in the step distance d that an observer can move before the viewing windows have moved so that the required system response time becomes $$T=(d-e)/v$$

where e is the measuring error. The broken line 31 in FIG. 8 illustrates the response time where e is 5 millimeters. Thus, the required response time is reduced to 22 milliseconds for a maximum head speed of 500 millimeters per second.

It is desirable to reduce the measuring error e but this cannot in practice be reduced to zero and there is a limit to how small the error can be made because of a number of factors including image resolution and the algorithms used in the tracking. In general, it is difficult to determine the measuring error until the algorithm for measuring the position data is implemented. For this reason, the above equation may be rewritten as:

$$v=(d-e)/T$$

This gives the maximum head speed at which an observer can see a continuous 3D image for a given measuring error and a given response time. The smaller the measuring error and the shorter the response time, the faster an observer can move his head. The step size, the measuring error and the system response time should therefore be such as to provide a value of v which meets the desired criterion, for instance of 500 millimeters per second.

A known type of infrared tracking system based on detecting infrared radiation reflected from a retroreflective spot worn by an observer between his eyes is called the DynaSight sensor and is available from Origin Instruments. The 3D coordinates of the retroreflective spot with respect to an infrared sensor are obtained at a rate of up to 64 Hz. This provides the required information on the observer head position relative to the retroreflective spot so that the left and right images can be directed to the correct eyes as the head moves.

Observer head position detection based on the use of infrared video cameras is disclosed in WO96/18925 and U.S. Pat. No. 5,016,282. Other such systems are available from IScan and HHI. However, all infrared based systems suffer from some or all of the following disadvantages:
the need for an infrared video camera system;
the use of a controlled infrared light source and the resulting component costs;
the complex arrangement between the infrared source and its sensor;
the inconvenience of attaching markers to the observer;
the extra power supply required for an infrared source; and
discomfort caused by shining infrared light towards the eyes of the observer at close range.

Several tracking systems are based on the use of visible light video cameras. For instance, U.S. Pat. No. 4,975,960 discloses a system which tracks the nostrils in order to locate the mouth for vision-augmented speech recognition. However, the precision of this technique is not sufficient for many applications and, in particular, for controlling an observer tracking autostereoscopic display.

Another technique is disclosed in the following papers:
T. S. Jebara and A. Pentland, "Parametrized Structure from Motion for 3D Adaptive Feedback Tracking of Faces", MIT Media Laboratories, Perceptual Computing Technical Report 401, submitted to CVPR November 1996; A. Azarbayejani et al "Real-Time 3D Tracking of the Human Body" MIT Laboratories Perceptual Computing Section Technical Report No. 374, Proc IMAGE'COM 1996, Bordeaux, France, May 1996; N. Oliver and A. Pentland "LAFTER: Lips and Face Real Time Tracker" MIT Media Laboratory Perceptual Computing Section Technical Report No. 396 submitted to Computer Vision and Pattern Recognition Conference, CVPR'96; and A. Pentland "Smart Rooms", Scientific American, Volume 274, No. 4, pages 68 to 76, April 1996. However, these techniques rely on the use of a number of sophisticated algorithms which are impractical for commercial implementation. Further, certain lighting control is necessary to ensure reliability.

Another video camera based technique is disclosed in A. Suwa et al "A video quality improvement technique for videophone and videoconference terminal", IEEE Workshop on Visual Signal Processing and Communications, 21–22 September, 1993, Melbourne, Australia. This technique provides a video compression enhancement system using a skin colour algorithm and approximately tracks head position for improved compression ratios in videophone applications. However, the tracking precision is not sufficient for many applications.

Most conventional video cameras have an analogue output which has to be converted to digital data for computer processing. Commercially available and commercially attractive video cameras use an interlaced raster scan technique such that each frame 32 consists of two interlaced fields 33 and 34 as illustrated in FIG. 9 of the accompanying drawings. Each field requires a fixed time for digitisation before it can be processed and this is illustrated in FIG. 10 of the accompanying drawings. Thus, the first field is digitised during a period 35 and computing can start at a time 36 such that the first field can be processed in a time period 37, during which the second field can be digitised. The time interval from the start of image digitisation to the moment at which the position data are obtained is referred to as the time latency as illustrated at 38. The update frequency relates to how frequently the position data are updated. If the computing time does not exceed the time for digitising one field as illustrated in FIG. 10, the update frequency is the same as the field digitisation rate.

As described hereinbefore, the required system response time includes not only the time latency 38 but also the communication time needed to pass the position information to the window steering mechanism and the time required to switch between the current window position and the next window position.

The field digitisation is performed in parallel with the computing process by using a "ring buffer". As illustrated diagrammatically in FIG. 11, a ring buffer 39 is a memory buffer containing two memory blocks 40 and 41, each of which acts a field buffer and is large enough to store one field of the digital image. Thus, while one of the buffers 40 and 41 is being used for digitising the current field, the other buffer makes available the previous field for processing.

The time required to capture a field of an image is 20 milliseconds for a PAL camera operating at 50 fields per second and 16.7 milliseconds for an NTSC camera operating at 60 fields per second. As described hereinbefore and illustrated in FIG. 8, for a typical autostereoscopic display, the tracking system 2, the display control processor 5 and the steering mechanism 6 shown in FIG. 1 have only about 22 milliseconds to detect and respond to head movement for a maximum head speed of 500 millimeters per second and a measuring error of 5 millimeters. If a PAL camera is used, the time left for processing the image and for covering other latencies due to communication and window steering is about 2 milliseconds. This time is increased to about 5.3 milliseconds if an NTSC camera is used. Thus, the available time limits the processing techniques which can be used if standard commercially attractive hardware is to be used. If the actual time taken exceeds this time limit, the observer may have to restrict his head movement speed in order to see a flicker-free stereo image.

Although the time required for digitising a video field may be reduced if a non-standard high speed camera is used, this is undesirable because of the substantially increased costs. Even if a high speed camera is used, there may be a limit to how fast it can be operated. It is very desirable to avoid the need for special light sources, whether visible or infrared, in order to achieve cost savings and improved ease of use. Thus, the tracking system 2 should be able to work with ordinary light sources whose intensities may oscillate at 100 or 120 Hz using the normal power supply i.e. twice the power supply frequency of 50 Hz, for instance in the UK, or 60 Hz, for instance in USA. If a camera is operating at a speed close to or above this frequency, images taken at different times may differ significantly in intensity. Overcoming this effect requires extra computing complexity which offsets advantages of using high speed cameras.

There is a practical limit to the computing power available in terms of cost for any potential commercial implementation. Thus, a low resolution camera is preferable so that the volume of image data is as small as possible. However, a video camera would have to cover a field of view at least as large as the viewing region of an autostereoscopic display, so that the head of the observer would occupy only a small portion of the image. The resolution of the interesting image regions such as the eyes would therefore be very low. Also, the use of field rate halves the resolution in the vertical direction.

There are many known techniques for locating the presence of an object or "target image" within an image. Many of these techniques are complicated and require excessive computing power and/or high resolution images in order to extract useful features. Such techniques are therefore impractical for many commercial applications.

A known image tracking technique is disclosed by R. Brunelli and T. Poggio "Face Recognition: Features Versus Templates", IEEE Trans on Pattern Analysis and Machine Intelligence, Volume 15 No. 10, October 1993. This technique is illustrated in FIG. 12 of the accompanying drawings. In a first step 45, a "template" which contains a copy of the target image to be located is captured, FIG. 13 illustrates an image to be searched at 46 and a template 47 containing the target image. After the template has been captured, it is used to interrogate all subsections of each image field in turn. Thus, at step 48, the latest digitised image is acquired and, at step 49, template matching is performed by finding the position at which there is a best correlation between the template and the "underlying" image area. In particular, a subsection of the image 46 having the same size and shape as the template is selected from the top left corner of the image and is correlated with the template 47. The correlation is stored and the process repeated by selecting another subsection one column of pixels to the right. This is repeated for the top row of the image and the process is then repeated by moving down one row of pixels. Thus, for an image having M by N pixels and a template having m by n pixels, there are (M−m+1) by (N−n+1) positions as illustrated in FIG. 14 of the accompanying drawings. The cross-correlation values for these positions form a two dimensional function of these positions and may be plotted as a surface as shown in FIG. 15 of the accompanying drawings. The peak of the surface indicates the best matched position.

A step 50 determines whether the peak or best correlation value is greater than a predetermined threshold. If so, it may be assumed that the target image has been found in the latest digitised image and this information may be used, for instance as suggested at 51, to control an observer tracking autostereoscopic display. When the next digitised image has been captured, the steps 49 to 51 are repeated, and so on.

Another template matching technique is disclosed in U.S. Pat. No. 3,828,122, which discloses a target tracking apparatus for an airborne missile having a video camera for providing a series of images. A user defines a target on the first image by moving a large rectangle (containing a small rectangle) over the image on a display. When the small rectangle is over the target, the image inside the small rectangle is stored in a target memory. When the next image is received, the position of the image inside the large rectangle is stored in a current frame memory and the apparatus determines whether the large rectangle is still centred on the target. In particular, the contents of the target memory are correlated with the contents of the current frame memory for all positions of the small rectangle within the large rectangle and the position giving the highest correlation is selected.

Although template matching is relatively easy for computer implementation, it is a computing-intensive operation. Direct template matching requires very powerful computer hardware which is impractical for commercial implementation. EP 0 579 319 discloses a method of tracking movement of a face in a series of images from a videophone. The centroid and motion vector for the face image are determined in a first frame and used to estimate the centroid in a subsequent frame. An image is "grown" around the estimated centroid by comparing areas around the centroids in the first and subsequent frames. The motion vector is estimated by comparing face positions in the first frame and in a preceding frame.

This technique suffers from several disadvantages. For instance, the shape and size of the image grown around the centroid may differ from frame to frame. The centroid does not therefore refer to the same place in the face image, such as the mid point between the eyes of an observer, and this results in substantial errors in tracking Further, after the initial position of the centroid has been determined in the first frame, subsequent estimations of the centroid position are based on determining the motion vector. Errors in determining the motion vector may therefore accumulate. Thus, although this technique may be suitable for videophone applications, it is not sufficiently accurate for use in observer tracking autostereoscopic displays.

SUMMARY OF THE INVENTION

According to a first aspect of the invention, there is provided an image tracking system comprising first means for presenting a sequence of images and second means for determining the position of a target image in a previously presented image from the first means, characterised by third means for determining movement of the target image between the previously presented image and a subsequently presented image from the first means, and fourth means for indicating the position of the target image in the subsequently presented image as the position determined by the second means modified by the movement determined by the third means.

It is thus possible to provide an image tracking system which provides a rapid indication of the position of the target image but which does not require undesirably or uncommercially large computing power. Movement of the target image between images can be detected relatively quickly but cannot be used alone because of the accumulation of errors. Determining the position of the target image takes more time but can be performed on the basis of an earlier image for which more time is available. For the or each tracking cycle, the indicated position is based on the accurately determined position by the second means and the movement determined by the third means so that errors do not accumulate and an indication of the position of the target image of good accuracy is provided relatively quickly. Commercially acceptable computing power may be used so that the tracking system is commercially attractive for many applications.

Although the previously and subsequently presented images may be any two images from the sequence, it is preferred for the subsequently presented image to be consecutive with the previously presented image.

The previously presented image may comprise each of the images of the sequence in turn.

The first means may be arranged to present the sequence of images in real time. The subsequently presented image may be the currently presented image. The first means may comprise a video camera.

The first means may comprise a memory for storing the previously presented image and the subsequently presented image.

The sequence of images may comprise consecutive fields of interlaced fields.

The second, third and fourth means may comprise a programmed data processor.

The fourth means is preferably arranged to add the movement determined by the third means to the position determined by the second means.

The third means may be arranged to determine the movement as soon as the subsequently presented image has been presented by the first means. The second means may be arranged to determine the position of the target image in the subsequently presented image as soon as the third means has determined the movement.

The second means may be arranged to search for the target image in a first image portion which is smaller than the images of the sequence and which includes the position indicated by the fourth means. The position indicated by the fourth means may be substantially at the centre of the first image portion. The second means may be arranged to search for the target image in the whole of the previously presented image if the search in the image portion is unsuccessful. The second means may be arranged to search for the target image in the whole of an initial previously presented image.

The second means may be arranged to perform template matching of the target image at a plurality of first positions in the first image portion to find a best match. The second means may be arranged to perform template matching of the target image at a plurality of second positions which are more finely spaced than the first positions and which are disposed adjacent a position corresponding to the best match. The second means may be arranged to perform a correlation between the target image and a respective region corresponding to each of the first and (when present) second portions and to select the highest correlation. The second means may be arranged to compare the highest correlation with a threshold for acceptability.

The system may comprise fifth means for capturing the target image by storing a portion of one of the images of the sequence. The fifth means may comprise a display for displaying the sequence of images, an image generator for generating a border image on the display, and a user operable control for actuating capture of an image region within the border image. The fifth means may comprise a farther user operable control for controlling the position of the border image on the display.

The third means may be arranged to determine movement at a plurality of image elements in a second image portion which is wholly within and smaller than the target image. The third means may be arranged to determine translational movement of the target image. The third means may be arranged to solve a set of equations:

$$f_1(x_i, y_i) = f_2(x_i, y_i) + \Delta x \frac{\partial f_2(x_i, y_i)}{\partial x} + \Delta y \frac{\partial f_2(x_i, y_i)}{\partial y}$$

where $x_i$ and $y_i$ are Cartesian coordinates of an ith image element, i is each integer such that $1 \leq i \leq j$ and j is an integer greater than one, $f_1$ and $f_2$ are functions representing the previously and subsequently presented images and $\Delta x$ and $\Delta y$ are the Cartesian components of the movement.

According to a second aspect of the invention, there is provided an observer tracking autostereoscopic display including a system in accordance with the first aspect of the invention.

The first means may comprise a video camera whose optical centre is disposed at an optical centre of the display.

According to a third aspect of the invention, there is provided an image tracking method for sequentially presented images, comprising determining the position of a target image in a previously presented image, determining movement of the target image between the previously presented image and a subsequently presented image, and indicating the position of the target image in the subsequently presented image as the position in the previously presented image modified by the determined movement.

It is thus possible to provide a non-intusive technique for observer tracking in autostereoscopic displays such that the observer is not required to wear a marker or other device. The observer can be observed by a relatively inexpensive "passive" video camera and no special control is required over the background or lighting. All the data required for observer tracking can be extracted in real time from video images alone. The technique can operate in real time, for instance up to 60 Hz with a time latency under 20 milliseconds, allowing the observer to move freely within the field of view of the display without any practical constraint on the speed of head movement. There are no excessive demands on computing power, which permits low cost commercial implementation.

The technique can operate under ambient light without any special arrangement of lighting sources. This improves the ease of use for a wider application environment. There is no visual discomfort because no active visible or infrared lighting sources are shone at the eyes. Cost is reduced because components and power supplies for active light sources are not required.

If the observer walks away from the display and returns later, the tracking system can relocate the target within such a short time that the user does not feel any substantial delay before being able to see the stereoscopic picture again. There is no loss of performance during following tracking processes and there is no need to reinitialise the system unless ambient lighting has changed significantly.

The invention will be further described, by way of example, with reference to the accompanying drawings, in which:

BRIEF DESCRIPTION OF THE DRAWINGS

FIG. 14 is a diagram illustrating the number of iterations required for template matching throughout a whole image;

FIG. 28 illustrates the effect of head rotation about a vertical axis.

Like reference numerals refer to like parts throughout the drawings.

DETAILED DESCRIPTION OF THE PREFERRED EMBODIMENTS

Figure 1:
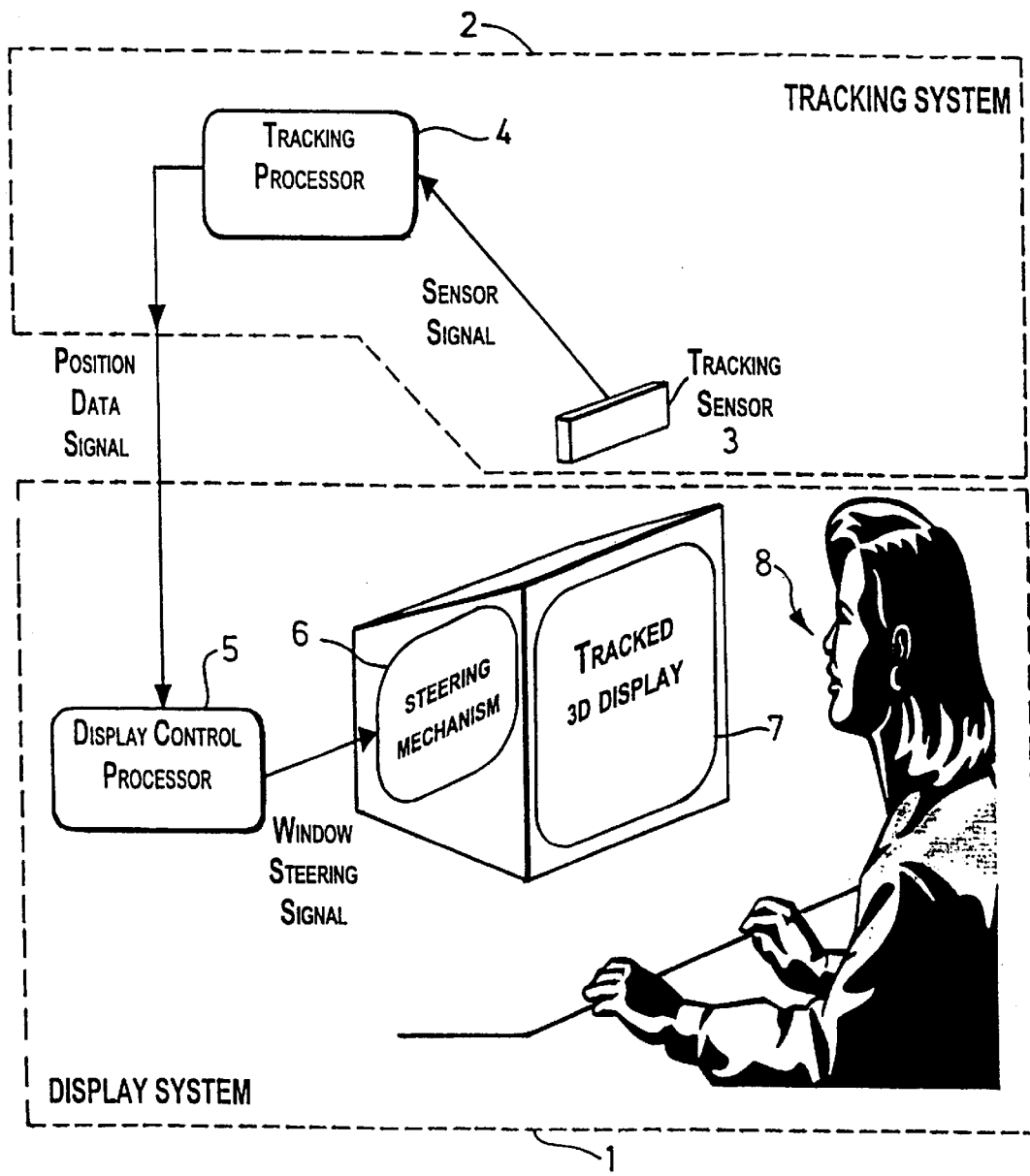
FIG. 1 is a schematic diagram of a known type of observer tracking autostereoscopic display.
Figure 16:
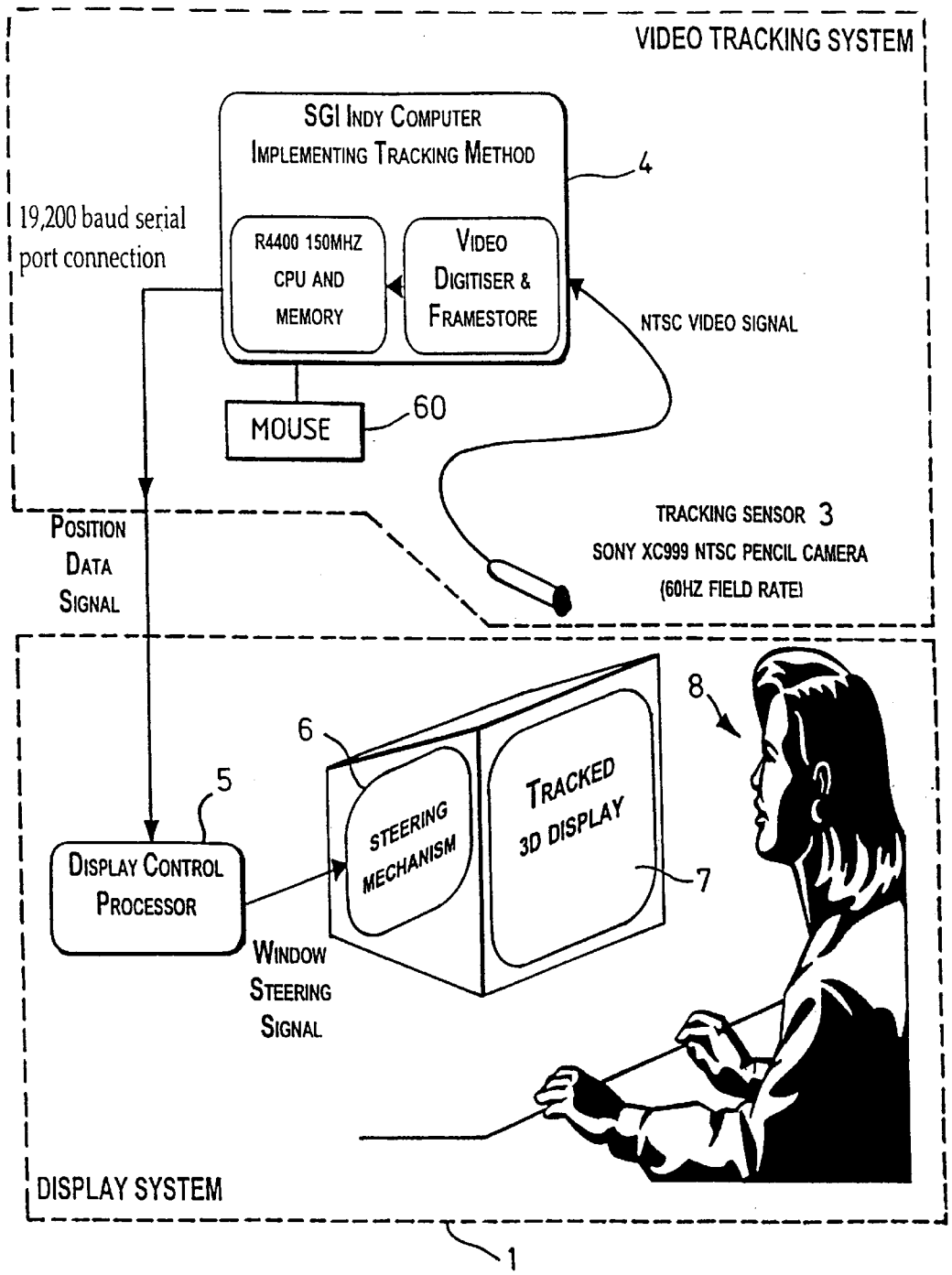
FIG. 16 is a schematic diagram illustrating an observer tracking display and a tracking system constituting embodiments of the invention.

FIG. 16 shows an observer tracking autostereoscopic display constituting an embodiment of the invention and including a video image tracking system also constituting an embodiment of the invention. The tracking system 2 shown in FIG. 16 differs from that shown in FIG. 1 in that the tracking sensor 3 comprises a Sony XC999 NTSC camera operating at a 60 Hz field rate and the tracking processor 4 is provided with a mouse 60 and comprises a Silicon Graphics entry level machine of the Indy series equipped with an R4400 processor operating at 150 MHz and a video digitiser and frame store having a resolution of 640×240 picture elements (pixels) for each field captured by the camera 3. The camera 3 is disposed on top of the 3D display 7 and points towards the observer 8 who sits in front of the display. The normal distance between the observer 8 and the camera 3 is about 0.85 meters, at which distance the observer has a freedom of movement in the lateral or X direction of about 500 millimeters. The distance between two pixels in the image formed by the camera 3 corresponds to about 0.7 and 1.4 millimeters in the X and Y directions, respectively, the Y resolution being halved because each interlaced field is individually used. The template described hereinafter is selected to have 150×50 pixels, corresponding to a region of about 105×70 millimeters. The mouse 60 is used during template capture as described hereinafter. The camera 3 captures and presents to the processor 4 a continuous sequence of images of the user under ambient lighting.

Figure 17:
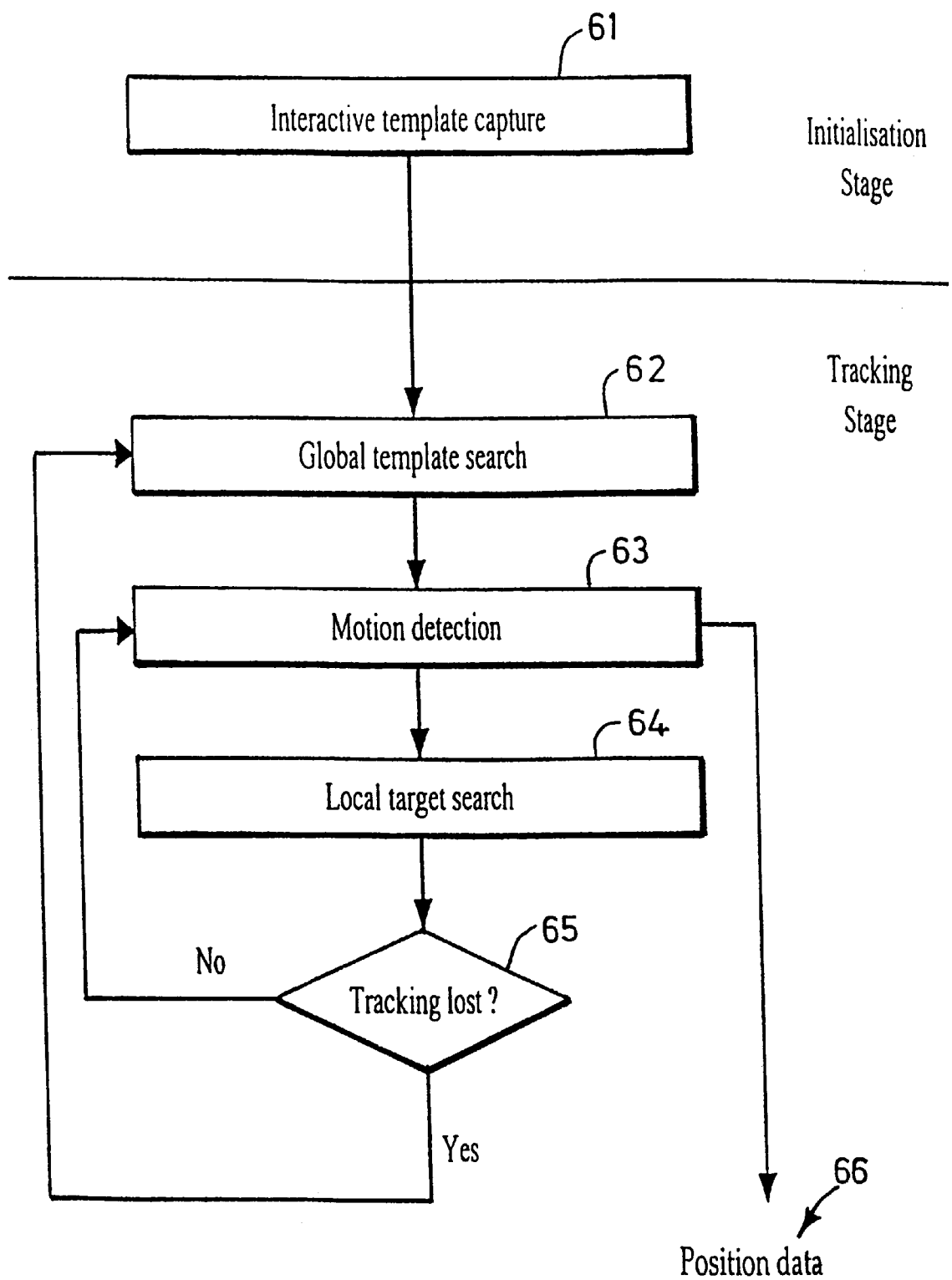
FIG. 17 is a general flow diagram illustrating an image tracking method constituting an embodiment of the invention.

FIG. 17 illustrates in general terms the tracking method performed by the processor 4. In an initialisation stage, a template comprising a target image is captured interactively at step 61. Following the initialisation stage, a tracking stage begins with a global template search at step 62. This is followed by a movement detection step 63 and a local target search 64. A step 65 checks whether tracking has been lost. If so, control returns to step 62 to perform another global template search. If tracking has not been lost, control returns to the motion detection step 63. Thus, steps 63 to 65 form a tracking loop which is performed for as long as tracking is maintained. The motion detection step 63 supplies position data as indicated at 66 by a differential movement method which determines the movement of the target image between consecutive fields and adds this to the position found by local template matching in the preceding step 64 for the earlier of the fields.

Figure 18:
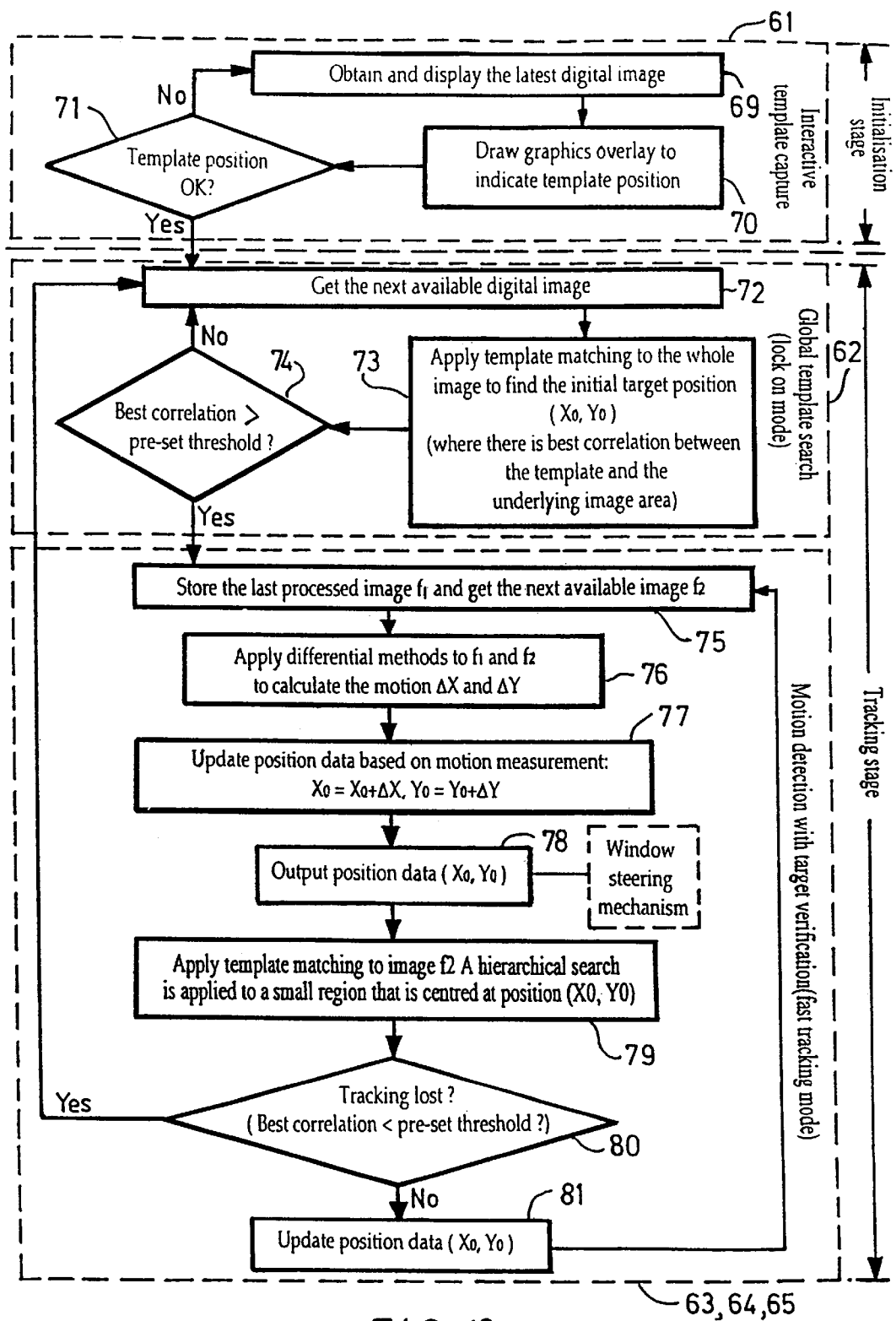
FIG. 18 is a more detailed flow chart of the method illustrated in FIG. 17.
Figure 19:
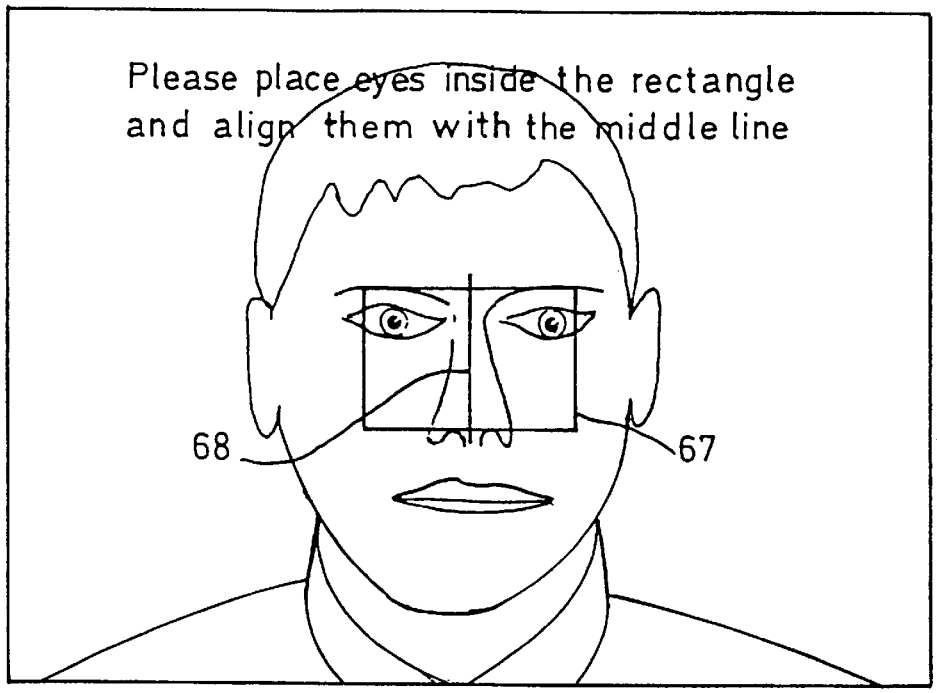
FIG. 19 illustrates the appearance of a display during template capture.

FIG. 18 illustrates the tracking method of FIG. 17 in more detail. The interactive template capture step 61 makes use of the display 7 and the mouse 60 to allow the user to select the target image which is to form the template. During this mode of operation, as shown in FIG. 19, the display 7 displays an image of the observer 8 as captured by the video camera 3. The processor 4 overlays the image with a graphical guide 67 of the required template size and with text indicating that the observer should place himself so that his eyes are inside the rectangle 67 on the display 7 and aligned with the middle line 68. When the observer has correctly positioned himself with respect to the graphical guide 67, he operates a button of the mouse 60 so that the processor 4 captures and stores the part of the image of the observer inside the graphical guide 67 for use as a template or target image.

Alternatively, the mouse may be used to drag the graphical guide 67 so that it is correctly aligned with the observer's eyes, after which the mouse button is pressed to store the target image.

An advantage of the interactive template capture 61 is that the observer is able to make the decision on the selection of the template with acceptable alignment accuracy. This involves the recognition of the human face and the selection of the interesting image region, such as the eye region. Whereas human vision renders this process trivial, template capture would be difficult for a computer, given all possible types of people with different age, sex, eye shape and skin colour under various lighting conditions. In fact, template capture can be performed for observers who wear glasses of any shape and colour whereas other known types of tracking systems cannot cope with observers wearing glasses.

As shown in FIG. 18, the step 61 comprises a step 69 in which the latest digital image is retrieved from the frame store of the processor 4. In step 70, the graphics overlay to indicate the template position is drawn. Step 71 tests whether the template position is correct by detecting whether an input device such as a mouse button has been operated. If not, control returns to the step 69. Once the target image has been captured, control passes to the global template search step 62.

A step 72 obtains the next available digital image from the frame store and a step 73 applies template matching to the whole image so as to find an initial position (having coordinates $X_0, Y_0$) of the target image forming the template. As described hereinafter, this is the position which gives best correlation between the template and the underlying image area. A step 74 determines whether the best correlation obtained in the step 73 is greater than a preset threshold. If not, control returns to step 72 and the process is repeated for the next available digital image. If the best correlation exceeds the threshold, control passes to the steps 63, 64 and 65 which provide motion detection with target verification.

In step 75, the last processed image $f_1$ is stored and the next available image $f_2$ is retrieved for processing. Step 76 applies a differential method as described hereinafter to the images $f_1$ and $f_2$ to calculate the motion or movement of the template between the images, which motion has Cartesian components $\Delta X$ and $\Delta Y$. Step 77 updates the position data by adding the movement calculated in the step 76 to the position determined during the previous template matching step so that the position data $X_0$ and $Y_0$ output by a step 78 to the window steering mechanism 6 via the display control processor 5 is formed as $X_0+\Delta X, Y_0+\Delta Y$.

After the step 78, a step 79 applies template matching to the image $f_2$ as described hereinafter. In particular, a hierarchical search is applied to a small region of the image centred at the position $X_0, Y_0$. The template matching involves a cross-correlation technique and a step 80 detects whether tracking is lost by comparing the best correlation obtained in the step 79 with a preset threshold. If the best correlation is less than the preset threshold, control returns to the step 72 of the global template search 62 so as to relocate the position of the target image within the next available digital image. If the best correlation is greater than the preset threshold, step 81 updates the position data by entering the position of the best correlation as the parameters $X_0$ and $Y_0$. Control then returns to the step 75 and the steps 75 to 81 are repeated for as long as observer tracking is required.

Figure 12:
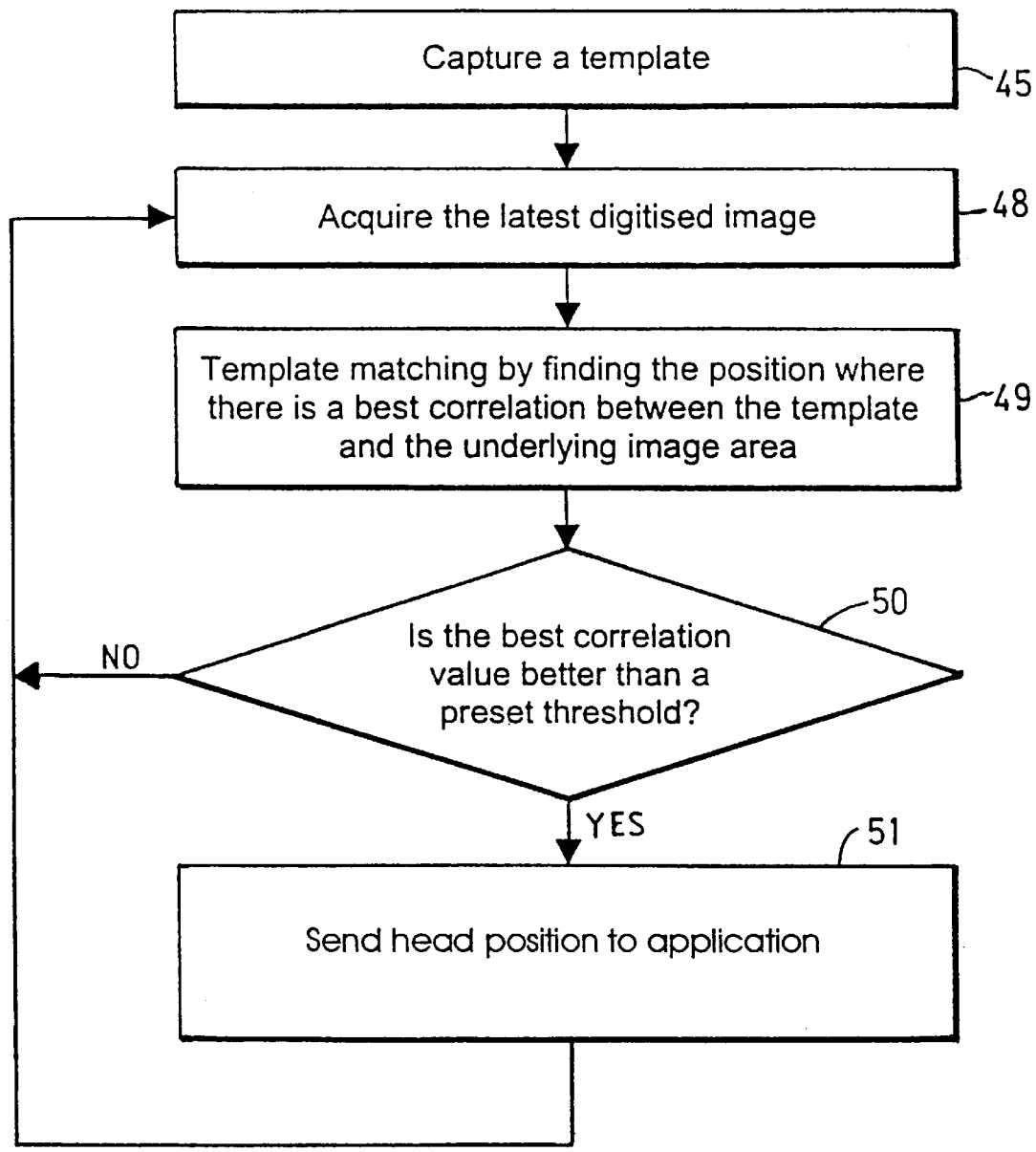
FIG. 12 is a flow diagram of a known template matching technique.
Figure 13:
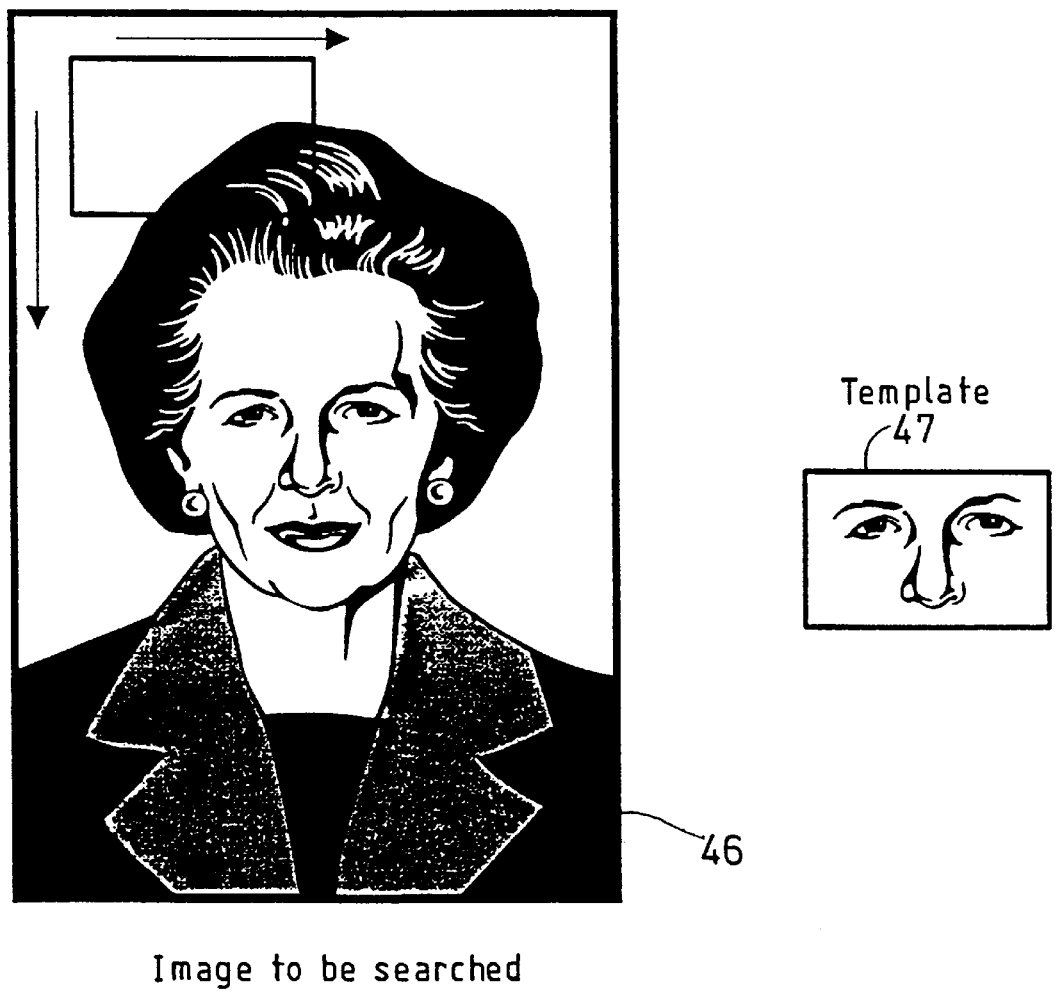
FIG. 13 illustrates template matching of an image and a suitable template.
Figure 15:
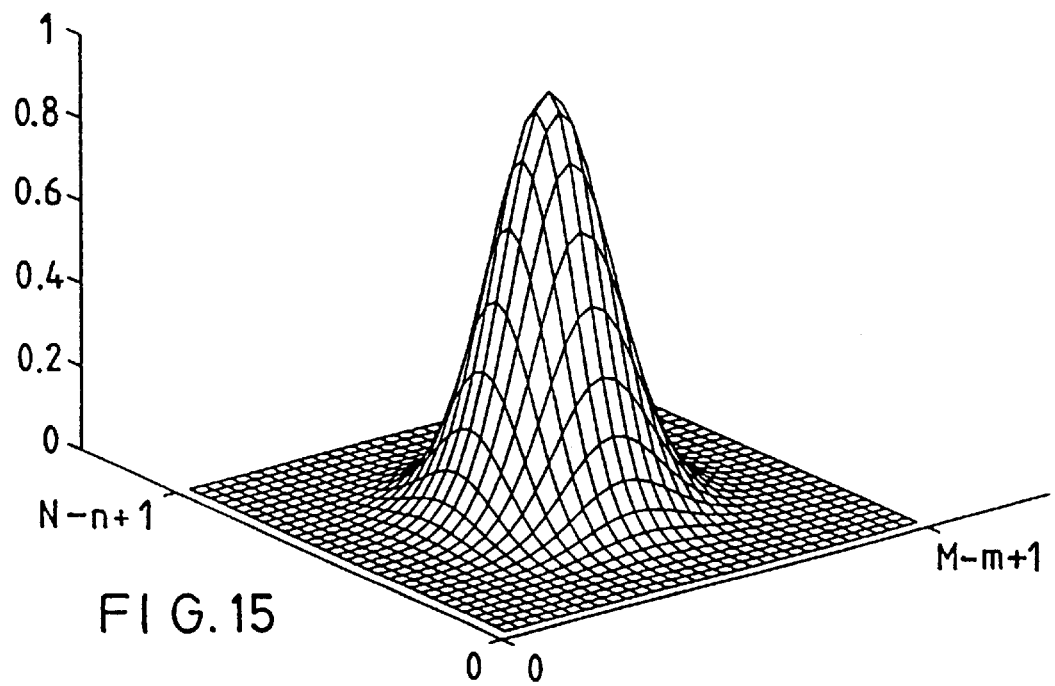
FIG. 15 illustrates a two dimensional surface representing cross-correlation values for different image positions.

The template matching step 73 is of the type described hereinbefore with reference to FIGS. 12 to 14. It is necessary to locate the target image within the whole image area as an initial step and whenever tracking is lost as determined by step 80. In particular, the differential movement detection method 76 cannot begin until the position of the target image within the whole image is known, In a preferred embodiment, template matching is performed by cross-correlating the target image in the template with each subsection overlaid by the template as described with reference to FIG. 14. The similarity between the template and the current subsection of the image may be measured by any suitable metric but the normalised cross-correlation is used in the preferred embodiment. The normalised cross-correlation $C(x_0,y_0)$ for the coordinates $x_0,y_0$ at the top left corner of the image area to be matched with the template is calculated as follows:

$$C(x_0, y_0) = \frac{\frac{1}{M}\sum_{(x,y)} f(x, y) Tp(x + x_0, y + y_0)}{\sqrt{C_f C_{Tp}}}$$

where $f(x, y)$ is a function representing the incoming image;

$Tp(x, y)$ is a function representing the target image of the template;

$(x, y)$ are the coordinates of each pixel in the template;

$M$ is the total number of pixels in the template;

$C_f$ is the autocorrelation of the image $f(x, y)$; and $C_{Tp}$ is the autocorrelation of the template $Tp(x, y)$.

The autocorrelations are given by the expressions:

$$C_f = \frac{1}{M}\sum_{(x,y)} f(x + x_0, y + y_0)^2$$

$$C_{Tp} = \frac{1}{M}\sum_{(x,y)} Tp(x, y)^2$$

The values of the cross-correlation $C(x_0, y_0)$ are in the range of [0.0,1.0], where the maximum value 1.0 is achieved when the template is identical to the underlying image.

Figure 20:
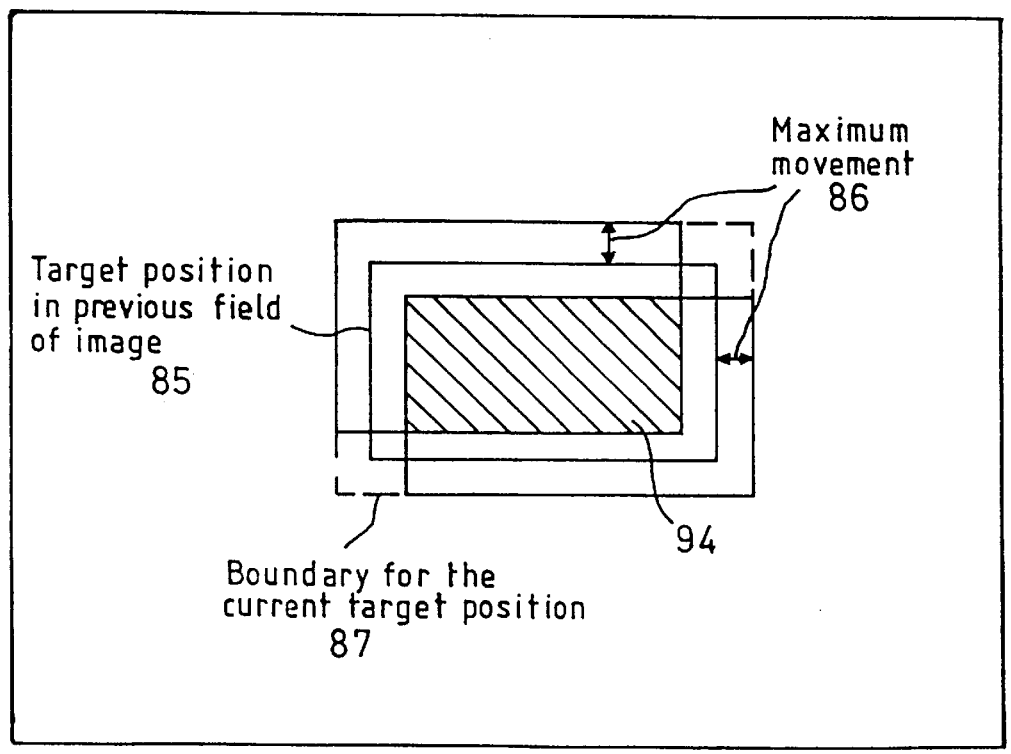
FIG. 20 illustrates the limited region of the image for which template matching is performed.

The same template matching technique is used in the step 79 but, in this case, template matching is applied to a relatively small region within the currently available image as illustrated in FIG. 20. The target image position located in the previous image field is indicated at 85. During the time interval between consecutive video image fields, the maximum movement which can occur is limited by the maximum speed of movement of the observer. In the specific example of hardware described hereinbefore, this corresponds to a maximum vertical or horizontal movement 86 of about 8.33 millimeters. Accordingly, the eye region of the observer must be within a boundary 87 having the same (rectangular) shape as the template and concentric therewith but taller and wider by 16.67 millimeters. The template matching step 79 is thus constrained within the boundary 87 so as to minimise the computing time.

Figure 21:
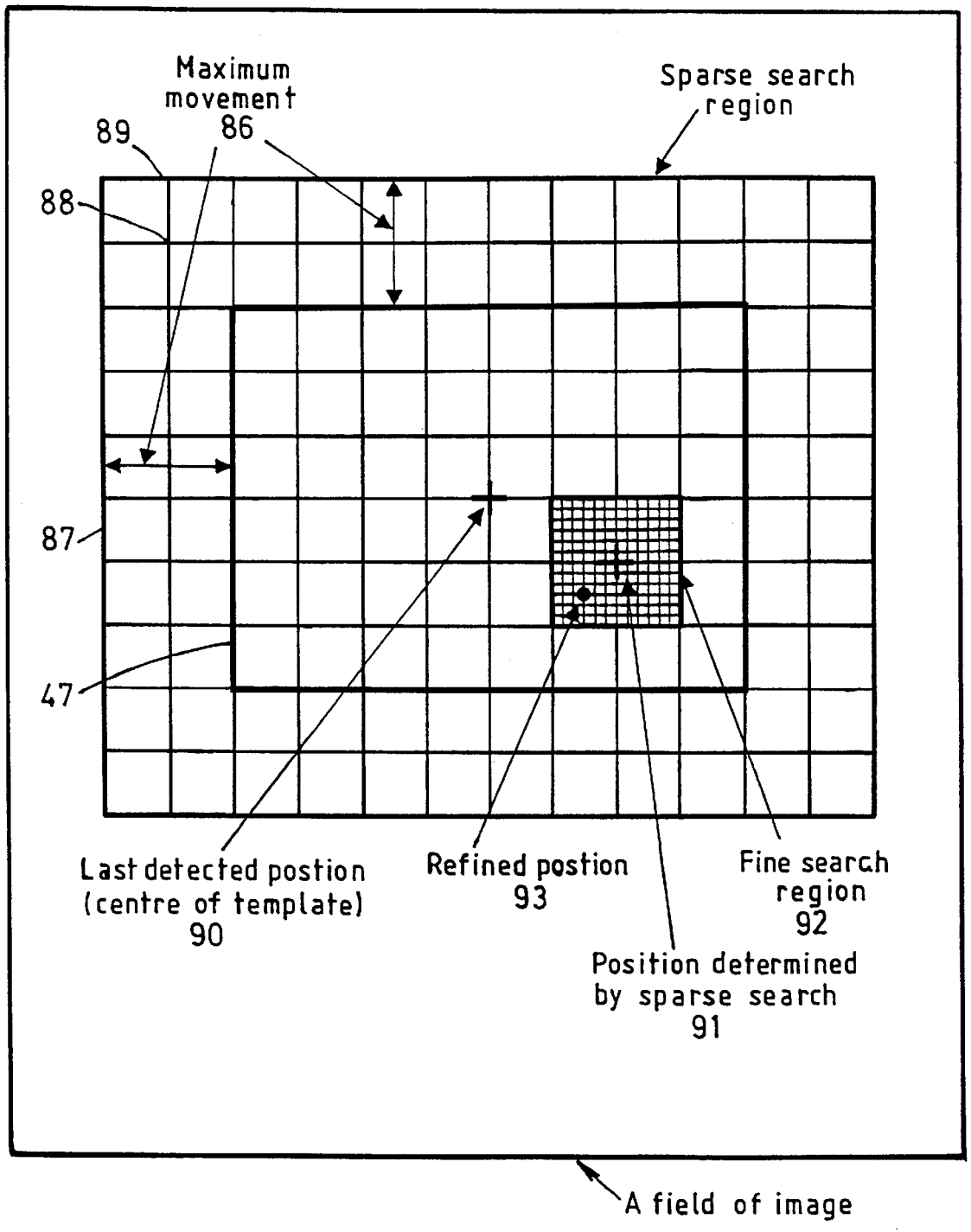
FIG. 21 illustrates hierarchical template matching.

In order further to optimise the template matching of the steps 73 and 79, an optimised hierarchical template matching technique is adopted as illustrated in FIG. 21. Template matching is performed in first and second sub-steps: In the first sub-step, template matching is performed at sparsely displaced positions within the whole image for the step 73 or within the boundary 87 for the step 79. Instead of using all pixels of the template 47 to perform the cross-correlation with the underlying image section, only the image elements such as 88 and 89 at the intersections of a relatively coarse grid of lines are used so that the template and the underlying image region are subsampled to reduce the volume of data which has to be processed in the cross-correlation calculation. Further, the data representing each image element may be truncated so as to reduce the calculation time.

The last detected position of the target image is indicated at 90. When the first sub-step of the template matching is complete, it is, for example, found that the maximum correlation occurs for the target image centred on the position 91.

The second sub-step is then performed so as to refine the new position of the target image. The same cross-correlation calculations are performed but, in this case, the search is confined to a smaller region 92, each of whose dimensions is twice the sparse step in the first sub-step. This sub-step is performed with a finer step and higher image element resolution and results in a refined position 93 being found for the target image in the currently processed image field.

Although the template matching step may be divided into more than two sub-steps, it has been found that, in practice, a two sub-step arrangement is adequate in terms of efficiency and accuracy. This is because, in the first sub-step, the step size between two neighbouring positions cannot be too large as otherwise it might easily miss the true "coarse" position.

As described hereinbefore, the steps 74 and 80 compare the best cross-correlation values obtained in the steps 73 and 79, respectively, with a preset threshold to determine whether the target image is present in the current image (in the case of the step 74) or is present within the boundary 87 of the image (for the step 80). In theory, the cross-correlation value at the best-matched position would be 1 if:

the head movement were translational;

there were no intensity change;

the camera were linear without any defect of optics;

there were no random noise from the electronic circuitry; and there were no digitisation errors.

In practice, these conditions cannot be satisfied so that the template will not find a perfect match in the image. The best cross-correlation value is therefore compared with the preset threshold to establish whether an acceptable match has been found and to prevent the system from locking onto inappropriate image portions of relatively low cross-correlation value. The preset threshold is determined heuristically by experimenting with a large number of people of different types under various lighting conditions. A typical value for the threshold is 0.5 for the case where normalised cross-correlation with a maximum value of 1.0 is used.

Although the template 47 may have any shape, a rectangular shape is preferred because it is easier for computer processing. The size of the template is important in that it can affect the computing efficiency and accuracy in determining the position of the target image. Larger templates tend to produce a sharper peak correlation so that the peak position can be determined more accurately, mainly because a larger image region contains more features of the face so that a small movement away from the peak position would change the cross-correlation value more substantially. However, a larger template requires more computing time. Also, the template should not exceed the boundary of the face of the observer in the image so as to prevent template matching from being affected by the background content of the images. A typical size for balancing these factors is one which is just large enough to cover the two eye regions of the observer in the images. For the parameters described hereinbefore, a template size of 150 by 50 image picture elements is suitable.

Although a point midway between the eyes of the observer is used to control steering of the viewing windows, other positions of the template such as the corners may be used if the calibration referred to hereinbefore is performed by a human observer. An offset is implicitly and automatically included in the results of the calibration.

The differential method 76 measures the relative movement between two consecutive image fields and assumes that this movement has been purely translational. The movement is determined from the intensity difference of the two consecutive image fields using the well-known Taylor approximations, for instance as disclosed in T. S. Huang (Editor), Image Sequence Analysis, ISBN 3-540-10919-6, 1983. If $f_1$ (x,y) denotes the intensity of an image feature in the first of the consecutive fields at a point (x,y) and the image feature moves by $(\Delta x,\Delta y)$ so that it is at position $(x+\Delta x,y+\Delta y)$ in the second field, then the grey level $f_2(x+\Delta x,y+\Delta y)$ of the second frame has the same grey level, i.e:

$$f_1(x,y)=f_2(x+\Delta x,y+\Delta y)$$

If the amount of motion is small, the right hand side of the above equation can be approximated using the Taylor expansion truncated to the first order differential terms as follows:

$$f_1(x,y) = f_2(x,y) + \Delta x \frac{\partial f_2(x,y)}{\partial x} + \Delta y \frac{\partial f_2(x,y)}{\partial y}$$

In this equation, $\Delta x$ and $\Delta y$ are the unknowns representing the movement. Thus, a pair of pixels from two consecutive images produce one equation so that two pairs of pixels produce a linear system of two equations, which can be solved for the two unknowns to give the amount of movement. In practice, a larger number of pixels is used to reduce random errors using the well known least squares method. For instance, 50 to 60 pairs of image picture elements may be used.

The pairs of elements should be selected from the target image, for instance the eye regions of the observer. However, the actual position of the target is not known before the amount of movement between consecutive fields has been determined. In practice, because there is a limit to the actual amount of movement between two consecutive fields as described hereinbefore with reference to FIG. 20, it is possible to choose the pairs of pixels from a region 94 shown in FIG. 20 which will always contain parts of the head in consecutive image fields irrespective of the direction of movement but provided the speed of movement of the observer is less than the designed maximum speed.

Figure 22:
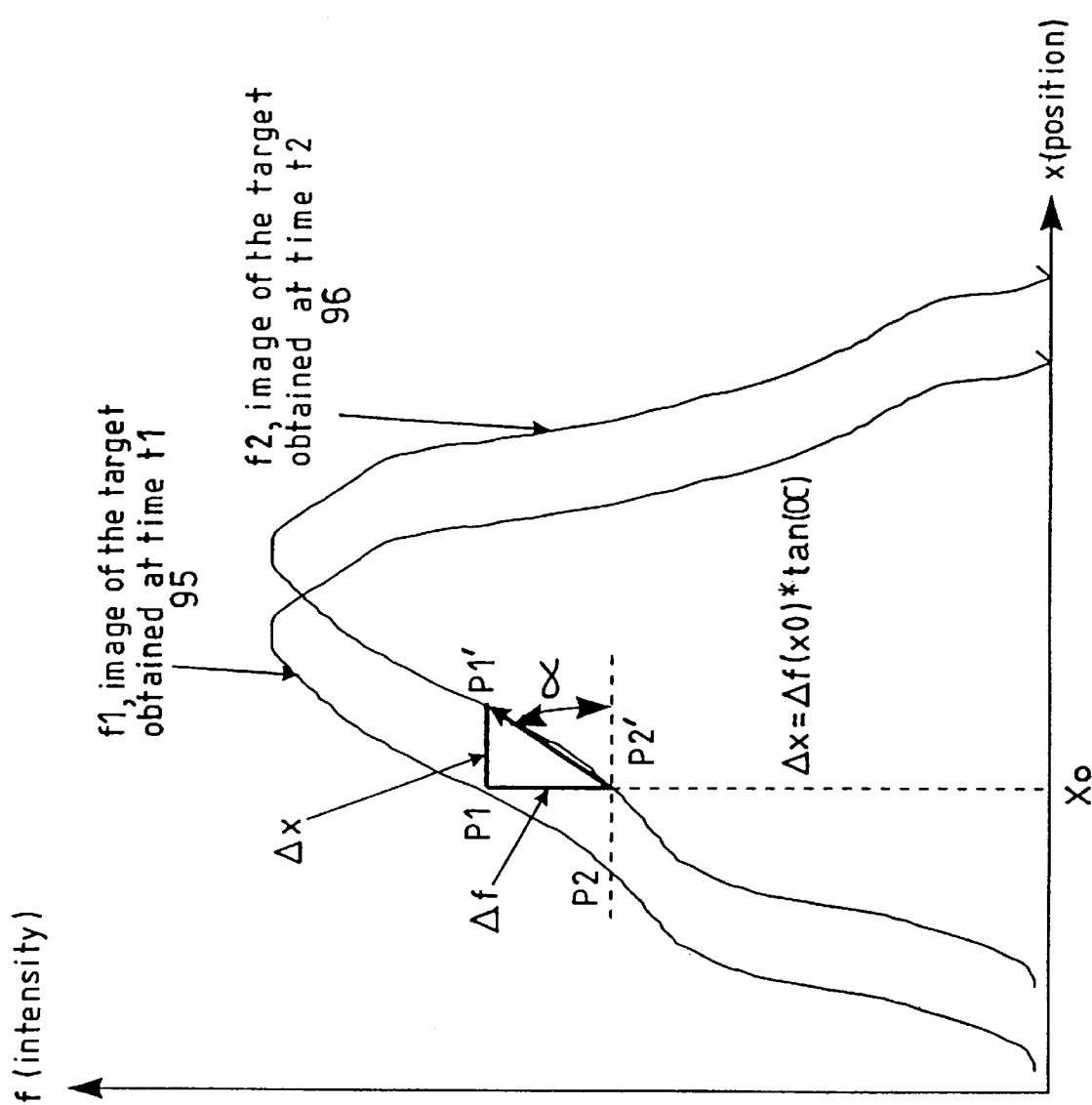
FIG. 22 is a diagram illustrating differential movement determination.

In order to illustrate the differential method more clearly, a one-dimensional example is shown in FIG. 22. In this case, the Taylor approximation reduces to:

$$f_1(x) = f_2(x) + \Delta x \frac{d f_2(x)}{dx}$$

This may be rewritten as:

$$\Delta f = \Delta x \cdot \frac{d f_2(x)}{dx}$$

where:

$$\Delta f = f_1(x) - f_2(x)$$

The curves 95 and 96 shown in FIG. 22 represent the images of a one dimensional moving target at times $t_1$ and $t_2$, respectively, corresponding to consecutive fields of an image. After this movement, a point $P_1$ at a position $x_0$ at time $t_1$ becomes a point $P_1'$ at a position $x_0+\Delta x$ at time $t_2$. Similarly, the point $P_2$ at time $t_1$ becomes a point $P'_2$ at time $t_2$. As illustrated by the simple triangular geometry in FIG. 22, the movement $\Delta x$ can be calculated from the intensity difference $\Delta f$ at the position $X_0$ and the gradient of the target intensity at this position.

In practice, the gradients in the two-dimensional Taylor approximation represented by the partial derivatives may be approximated by numerical differences i.e:

$$\frac{\partial f_2(x,y)}{\partial x} = f_2(x+1,y) - f_2(x,y)$$

$$\frac{\partial f_2(x,y)}{\partial y} = f_2(x,y+1) - f_2(x,y)$$

These approximations suffer from the inevitable noise present in the image fields. One way of reducing this effect is to fit a polynomial surface over a small window. For instance, over a 3×3 element window, the image may be fitted with the following surface:

$$f(x,y)=ax^2+by^2+cxy+dx+ey+g$$

The parameters {a,b,c,d,e,g} are determined by minimising the following cost function:

$$s = \sum_{(x,y)} [f(x,y) - ax^2 - by^2 - cxy - dx - ey - g]^2$$

where the summation is over the 3×3 window centred at the current pixel. The minimisation is achieved when the partial derivative with each parameter is zero. This provides a system of equations which can easily be solved. The partial derivatives of f(x,y) are then calculated as:

$$\frac{\partial f(x,y)}{\partial x} = 2ax + cy + d$$

$$\frac{\partial f(x,y)}{\partial y} = 2by + cx + e$$

for a 3×3 window, the final expressions may be represented by the following filters:

$$\begin{bmatrix} -1 & 0 & 1 \\ -1 & 0 & 1 \\ -1 & 0 & 1 \end{bmatrix}$$

$$\begin{bmatrix} -1 & -1 & -1 \\ 0 & 0 & 0 \\ 1 & 1 & 1 \end{bmatrix}$$

which are the conventional Prewitt edge detectors.

The differential method 76 is computationally efficient and, in the specific embodiment as described herein, requires only about 2 milliseconds while providing suitable accuracy so that the output of position data supplied at step 78 may be used to control the steering mechanism 6 of the autostereoscopic display. However, the motion detection method cannot be used on its own to achieve robust tracking because there are always measuring errors in the detected movement. Merely repeating the motion detection method without intervening correction causes errors to accumulate so that accurate tracking is rapidly lost. The template matching step 79 is necessary to provide an accurate position measurement for each consecutive field and the errors occurring in the differential method 76 for a single iteration are too small to affect accurate observer tracking. The target verification provided by the step 79 verifies that, at the detected position, the target image is indeed there and also refines the position data before the next motion detection step 76. As mentioned hereinbefore, the motion detection step takes about 2 milliseconds which, in the case of a field repetition rate of 60 Hz leaves about 14.7 milliseconds before the next digitised image is ready. This "waiting time" is sufficient for the template matching step 79 to perform the target verification.

The step 77 adds the movement determined in the step 76 to the position determined in the step 79 for the previous image field. Thus, accumulative errors in the differential method step 76 are avoided since the results of only one differential method step 76 (with only one set of errors) are used to indicate the target image position at the step 78. Although the template matching step 79 calculates a target image position containing errors, such errors do not accumulate because the template is matched each time to the current image of the target. The resulting position data is thus always the true position of the target plus a single measuring error.

The motion detection and template matching work together in an efficient way. The motion detection produces position data quickly so that the time latency is as short as possible. The result of motion detection confines the search area for template matching. The use of template matching confirms the target position and prevents the accumulation of measuring errors due to motion detection. This efficient combination makes it possible to produce a reliable tracking system which is suitable for observer tracking autostereoscopic 3D displays in that it satisfies the requirements of short time latency, high update frequency and sufficient measurement accuracy.

Figure 11:
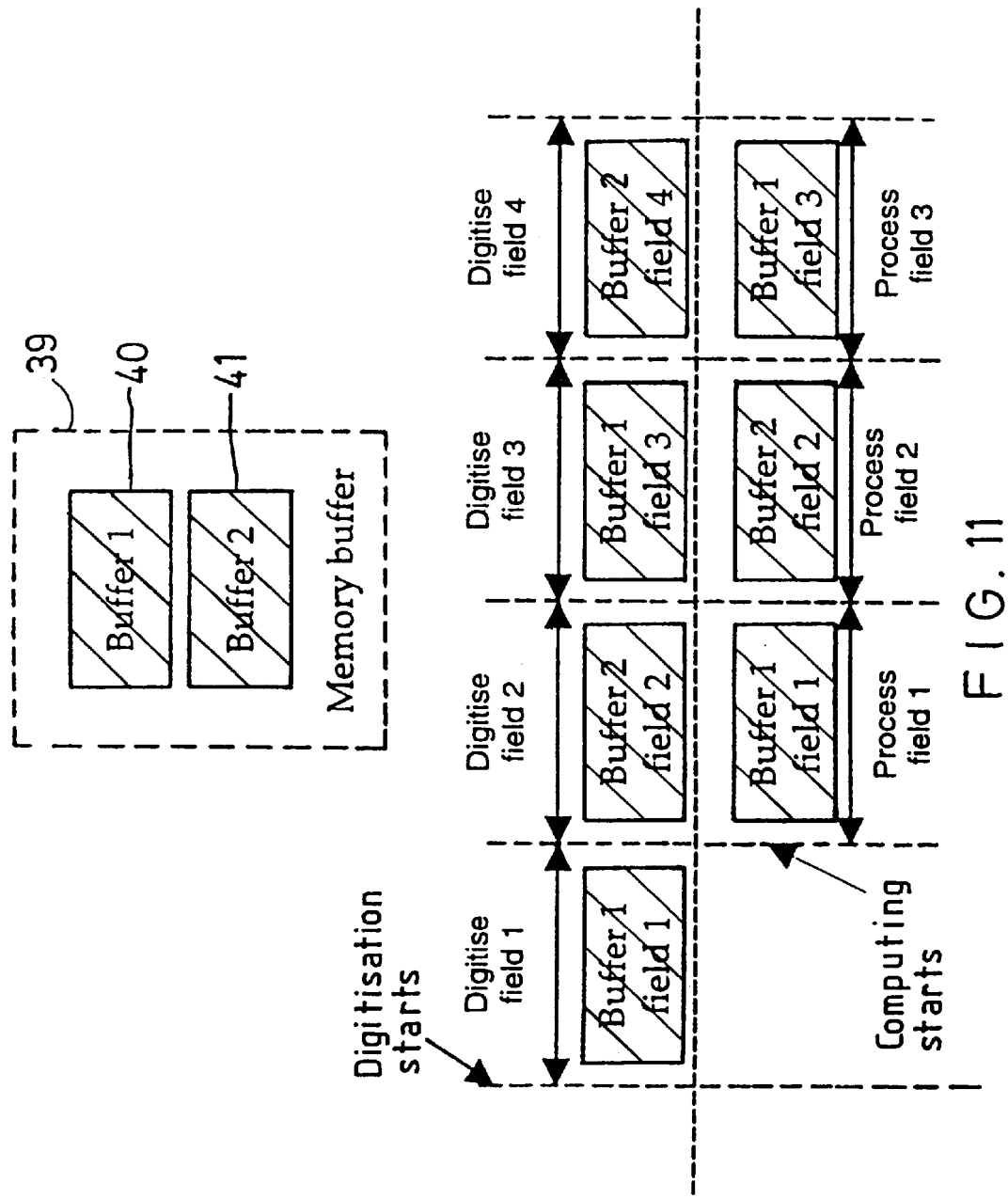
FIG. 11 is a diagram illustrating the use of a ring buffer for simultaneous digitisation and processing.
Figure 23:
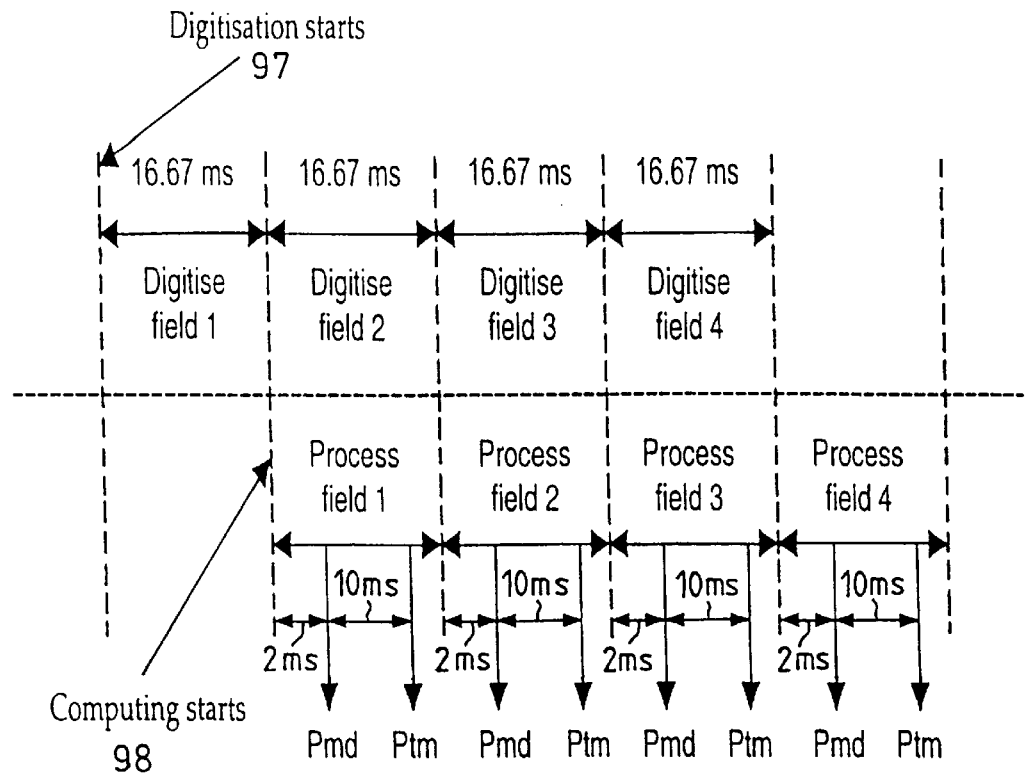
FIG. 23 is a diagram illustrating the timing of the method illustrated in FIGS. 17 and 18.

FIG. 23 illustrates the timing of the steps 76 and 79 in relation to the timing of digitisation of the sequence of image fields. Digitisation starts at the time indicated at 97 and, using the NTSC video camera with a 60 Hz field rate as shown in FIG. 16, each field is digitised in a period of 16.67 milliseconds. The processor 4 contains a ring buffer of the type illustrated in FIG. 11 so that each field is available from its respective buffer memory whilst the subsequent field is being captured.

Figure 2:
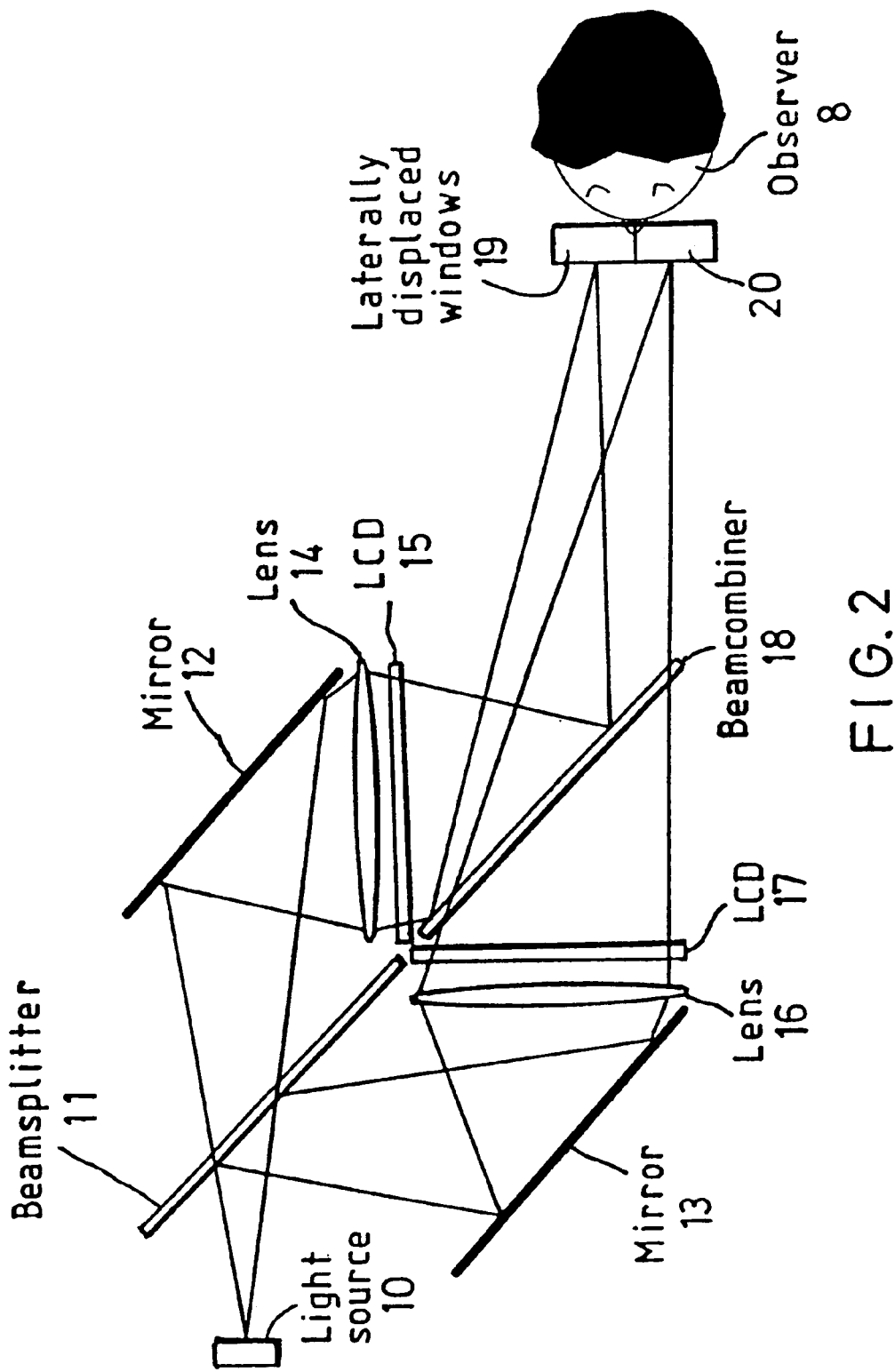
FIG. 2 is a diagrammatic plan view of a specific known type of autostereoscopic display.

Assuming that computing starts at the time indicated at 98 and the global template search 62 has already been performed to give an initial position of the target image, the step 76 is performed in about 2 milliseconds and the position data Pmd is then available for adding to the position Ptm obtained in the preceding step 79 by template matching. Thus, the step 76 begins immediately after a fresh field has been captured and digitised. The step 79 ends immediately after the step 76 has been completed and takes about 10 milliseconds. Thus, the whole image tracking for each image field is completed within the time required to digitise an image field so that the repetition rate of the observer position measurements is equal to the field repetition rate of 60 Hz. The latency of position measurements is 18.7 milliseconds and an X accuracy of better than 5 millimeters can be obtained. This is sufficient for the image tracking system to be used, for instance, in the autostereoscopic display illustrated in FIG. 2.

The global template search 62 takes a fixed time of approximately 60 milliseconds. If the target image is lost during the steps 63, 64 and 65, for instance if the observer moves out of the field of view of the video camera 3, the tracking system detects that the target image has been lost and changes to the global template search 62 until the observer moves back into the field of view and is located again by the tracking system.

The differential method 76 works well when the motion between two consecutive fields does not exceed three to four image picture elements. This is about the average speed of an observer for a typical embodiment of the autostereoscopic display shown in FIG. 2 but, in practice, the observer may move twice as fast as this from time to time. In these circumstances, the differential method tends to underestimate the amount of movement. One technique for solving this problem is to use an iterative differential method. For instance, if the target image has moved by 7 pixels between consecutive fields but the first iteration estimates a movement of 4 pixels, the second image field can be shifted by 4 pixels before another iteration. The relative movement between the shifted field and the previous field is now about 3 pixels which may be accurately measured. Although more than two iterations may be used, two iterations have been found to be adequate in practice.

Figure 3:
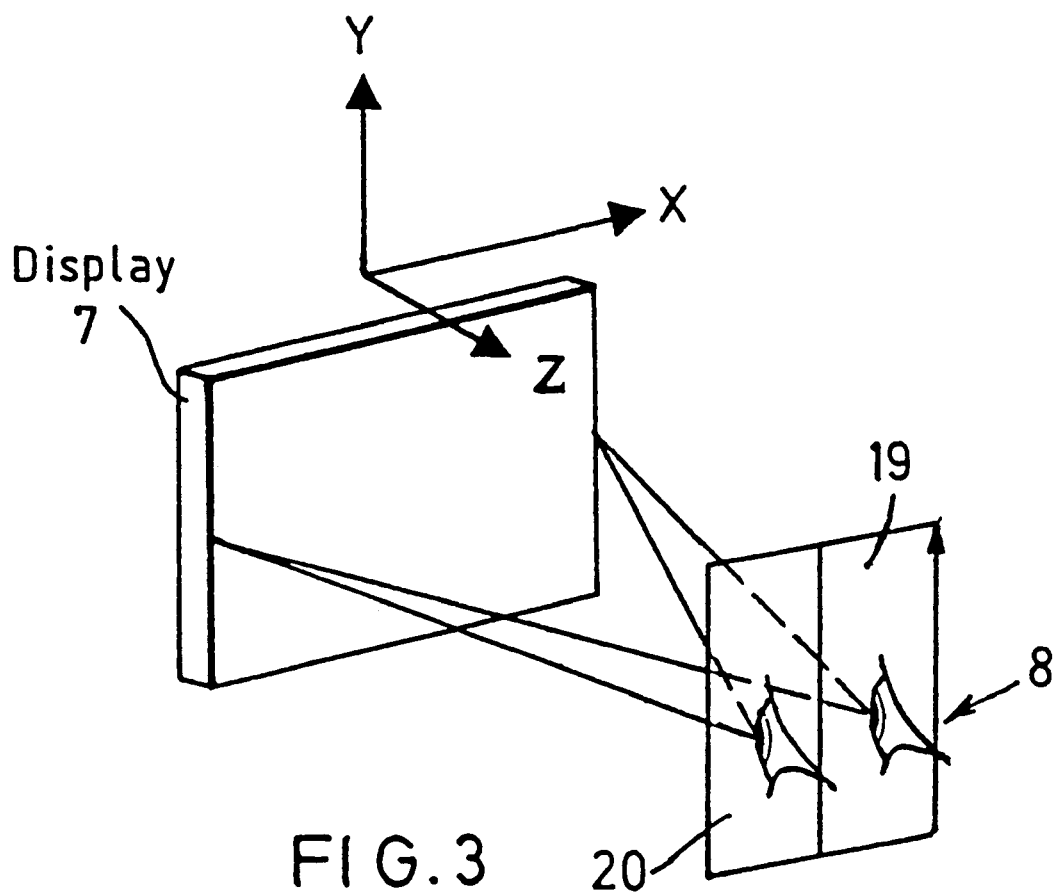
FIG. 3 is diagram illustrating the generation of viewing windows in autostereoscopic displays.

As described hereinbefore, the observer position data may be represented in terms of Cartesian coordinates as illustrated in FIG. 3. The tracking system described hereinbefore implements XY head tracking, but X position data alone may be sufficient for steering the viewing windows if the observer does not move in the Z direction but remains in the window plane 23 of the display. Usually, Z tracking is required if the observer is to move in the Z direction. However, for a special case where the optical centre of a lens 99 of the camera 3 is aligned with the optical centre 29 of the display, Z tracking is not explicitly required.

Figure 7:
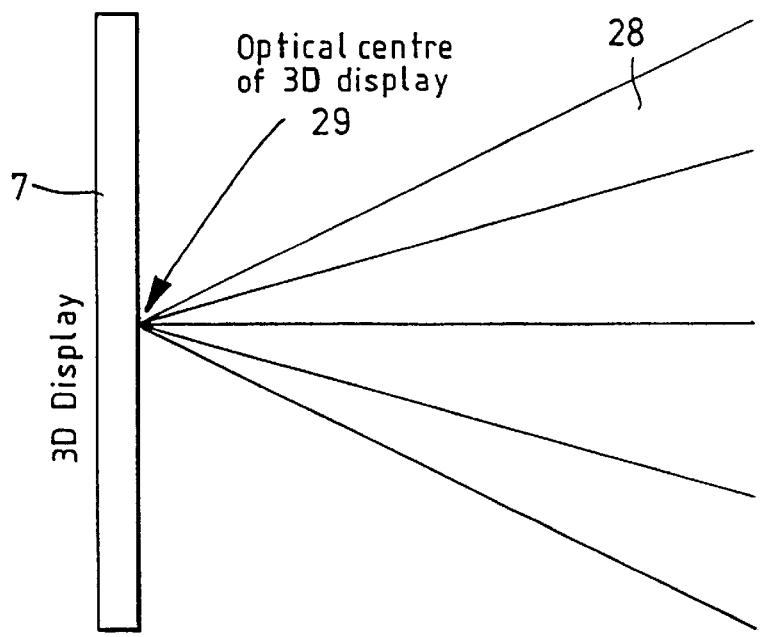
FIG. 7 is a diagrammatic plan view illustrating the generation of viewing zones in an autostereoscopic display.
Figure 8:
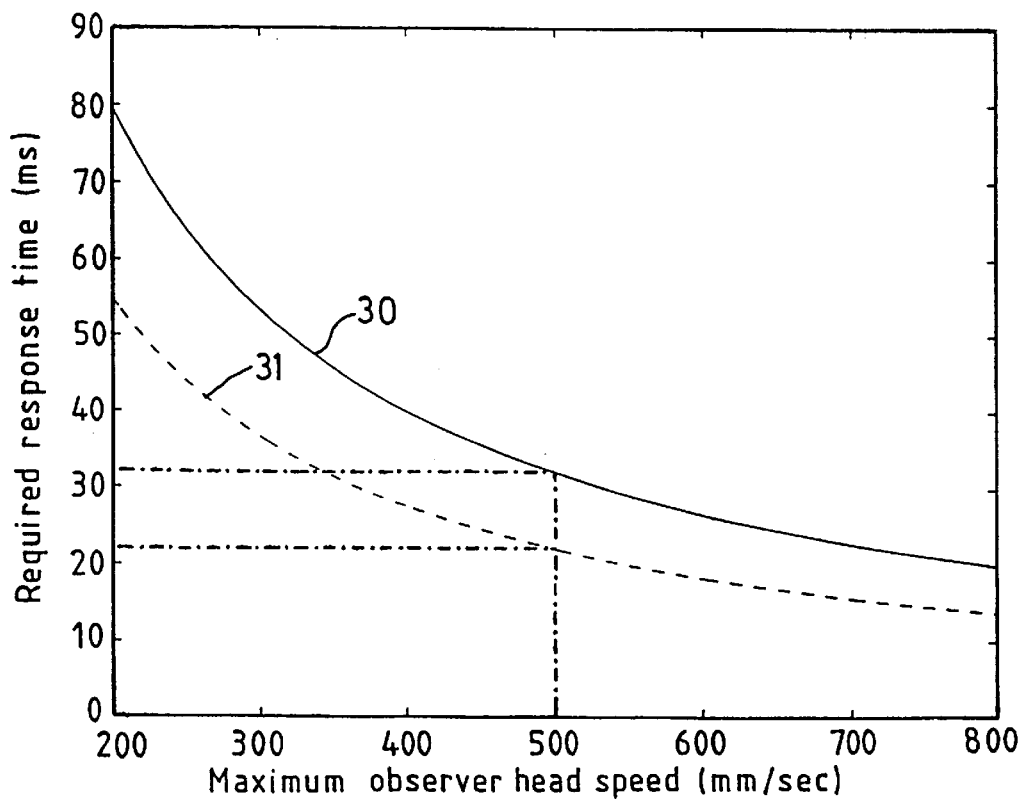
FIG. 8 is a graph illustrating observer tracking response time as a function of maximum observer head speed.
Figure 9:
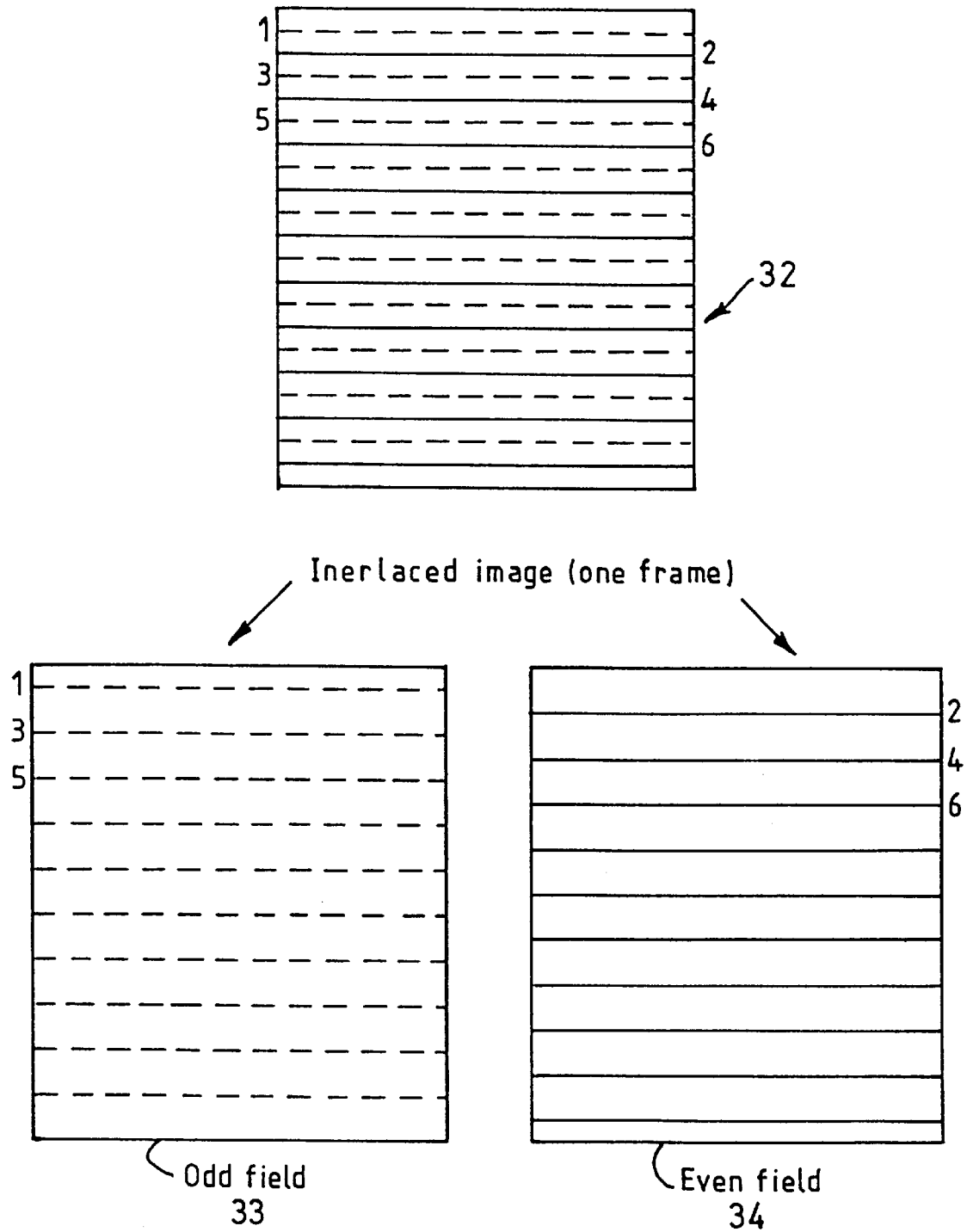
FIG. 9 illustrates an image frame composed of interlaced odd and even fields.
Figure 10:
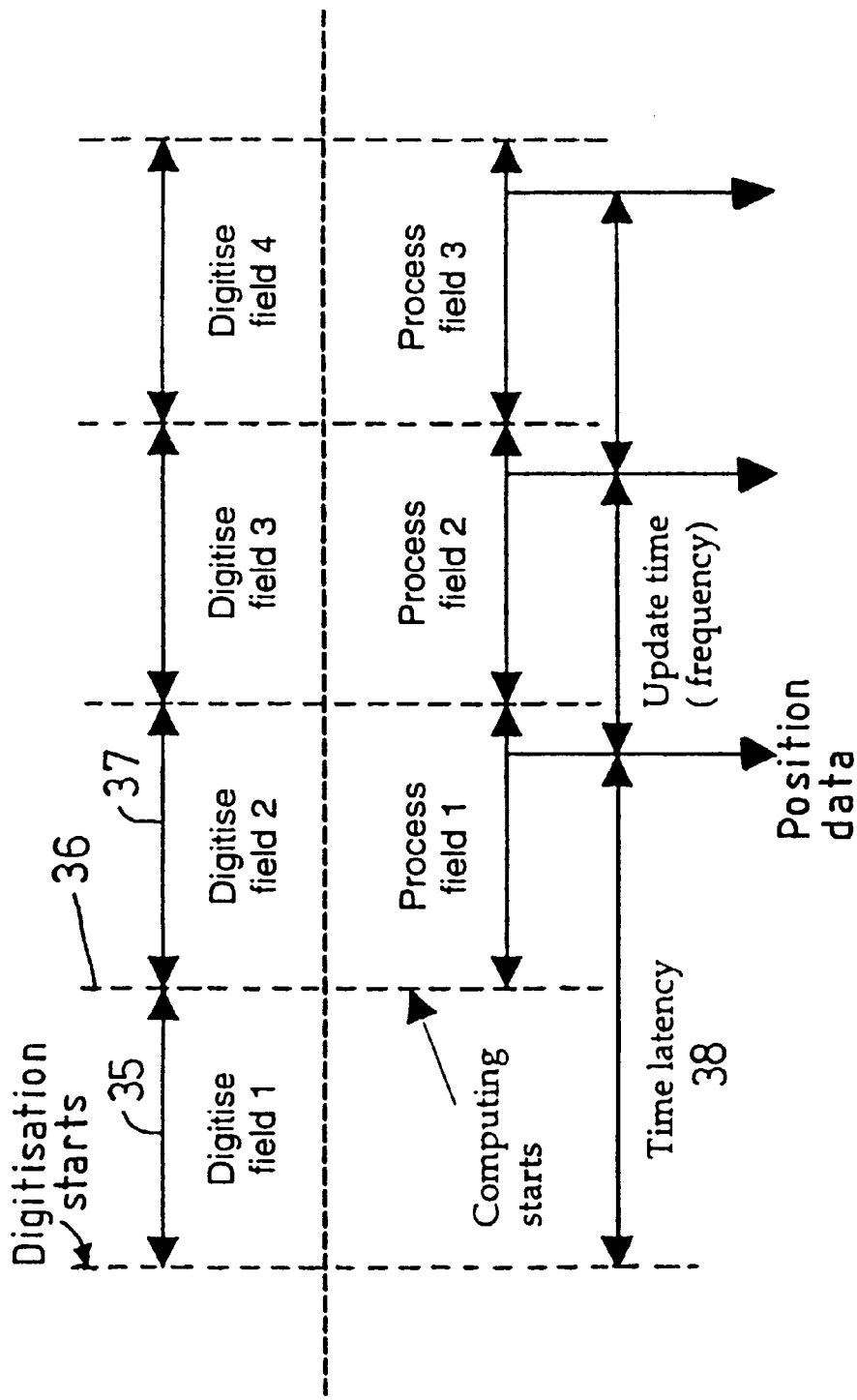
FIG. 10 is a diagram illustrating the timing of field digitisation and processing.
Figure 24:
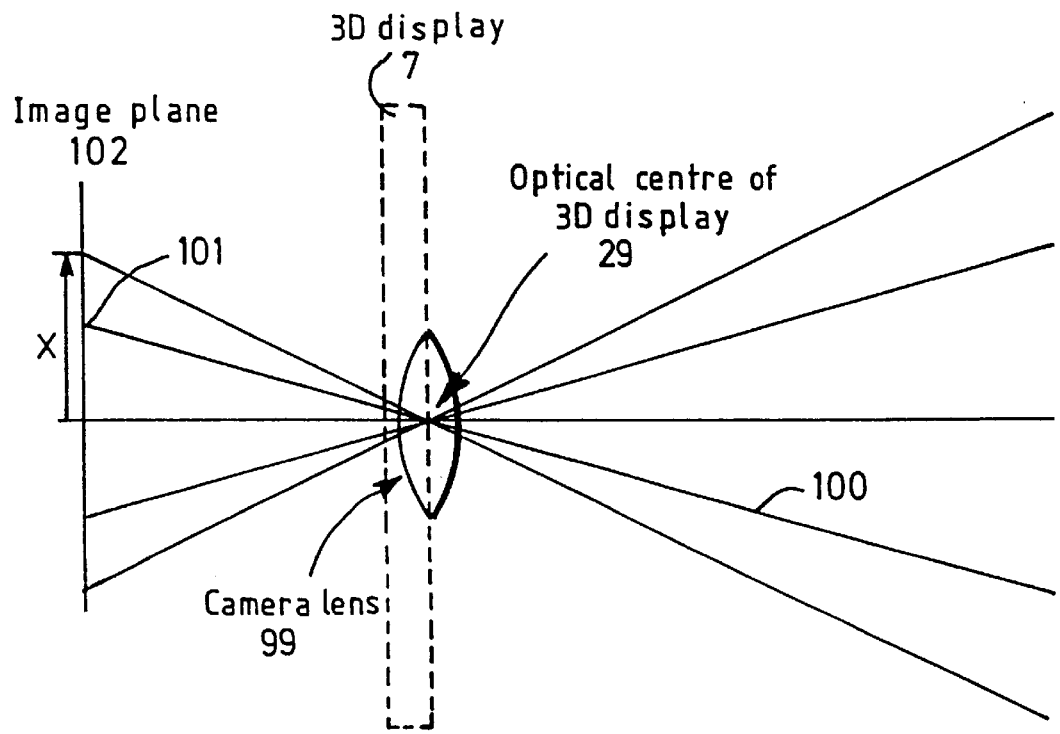
FIG. 24 is a diagrammatic plan view illustrating a preferred position of a video camera with respect to a 3D display.

As illustrated in FIG. 7, the viewing zones 28 are angularly spaced in the horizontal XZ plane. With the optical centre of the camera lens 99 aligned with the optical centre 29 of the display as shown in FIG. 24, all points on the same switching line such as 100 are imaged to the same point such as 101 on the image plane 102 of the camera 3. The X position of the camera pixel image therefore indicates the angular position of the observer and can be supplied directly to the optical system of the display 7 to provide correctly steered viewing windows without requiring any knowledge of the Z position of the observer. This particular arrangement therefore allows the use of a single camera with increased accuracy and shortened response time so that the tracking system is particularly suitable for this type of Autostereoscopic display.

Figure 4A:
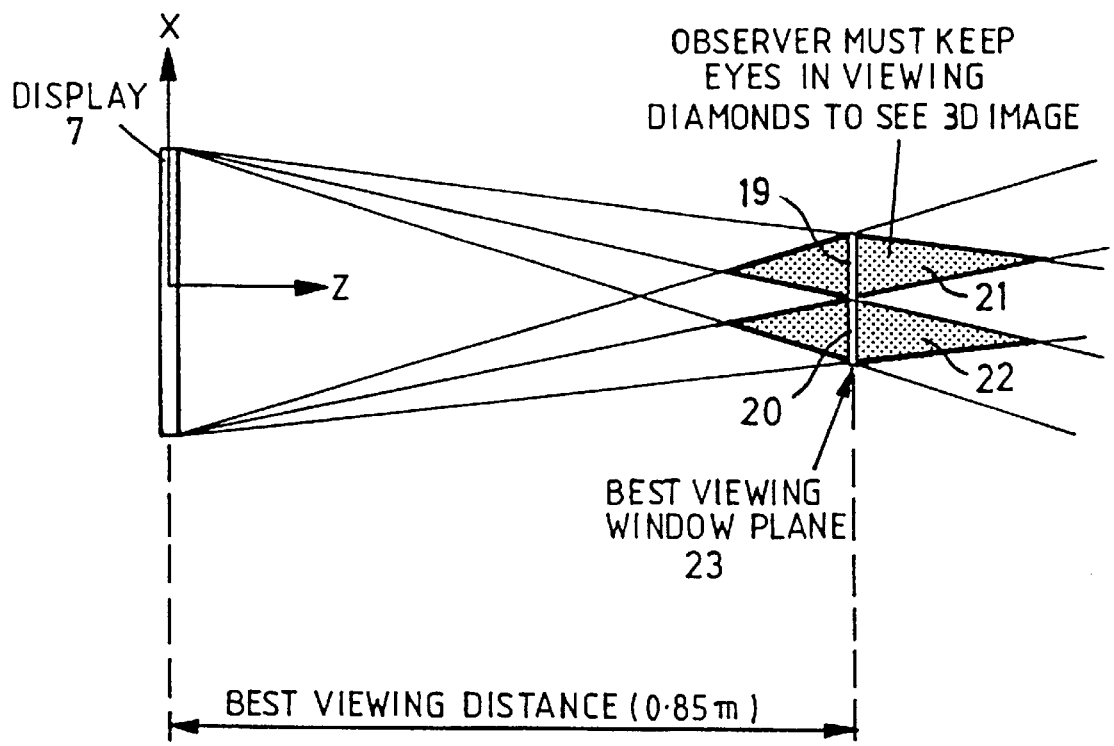
FIG. 4a is a diagrammatic plan view illustrating the generation of viewing zones in autostereoscopic displays.
Figure 4B:
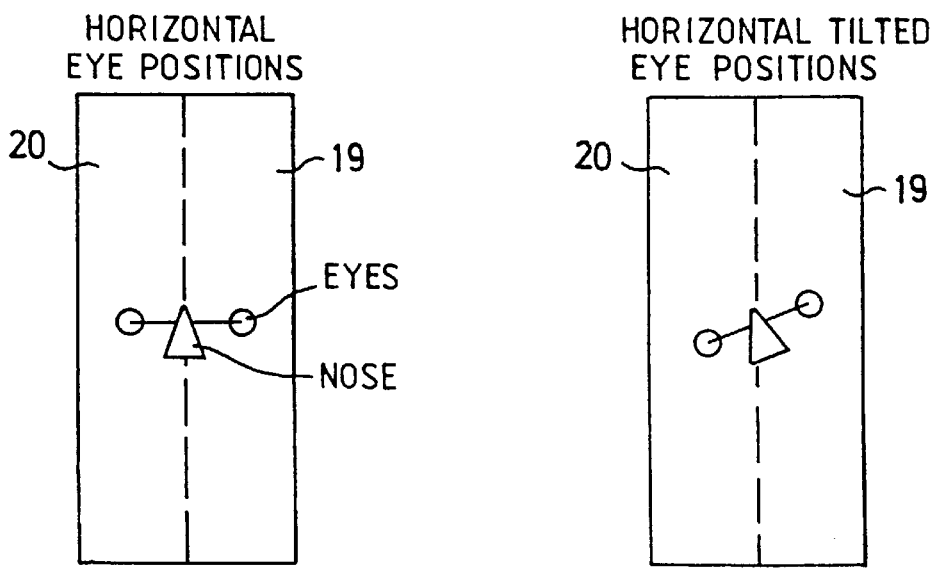
FIG. 4b illustrates the desired relative positions of viewing windows and the eyes of an observer for horizontal and horizontally tilted eye positions.
Figure 5:
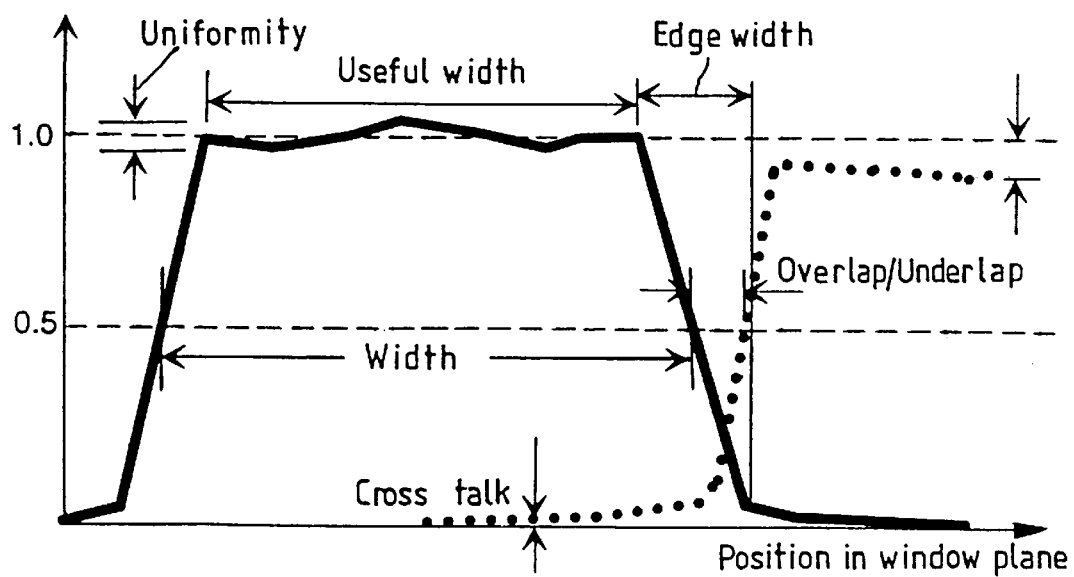
FIG. 5 is a graph illustrating a typical intensity profile of a viewing window of autostereoscopic display.
Figure 6:
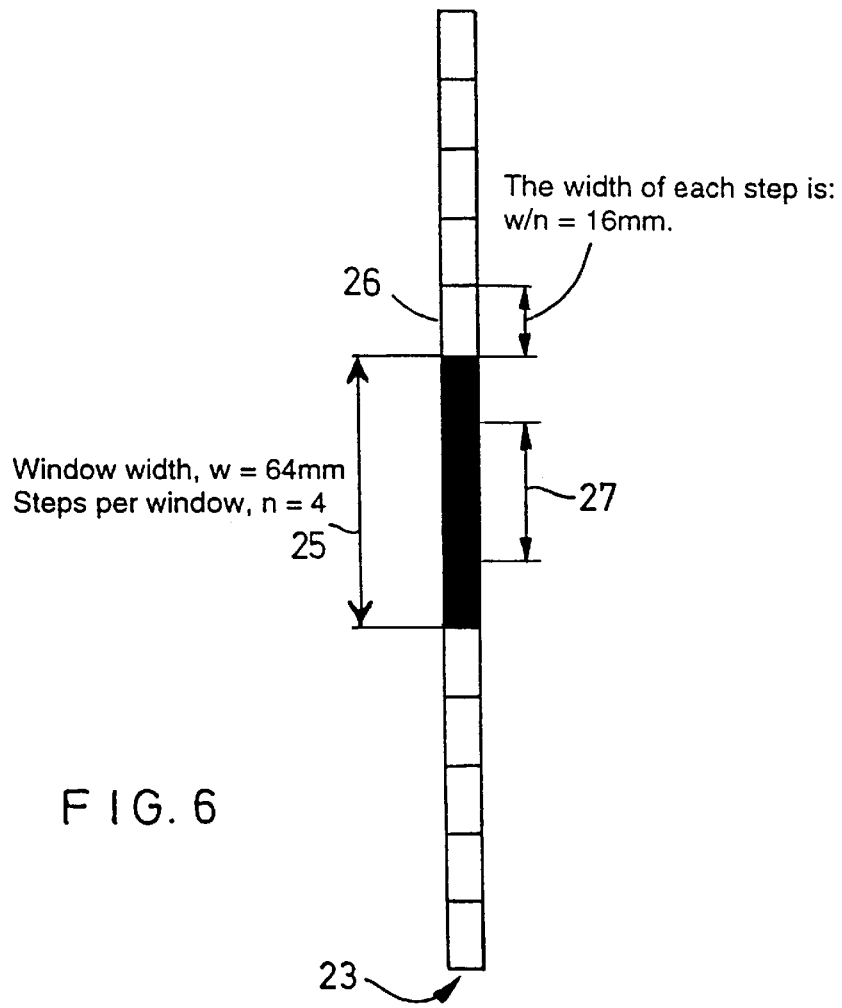
FIG. 6 is a diagram illustrating discrete positions of a viewing window of an autostereoscopic display.

As illustrated in FIG. 4, autostereoscopic displays typically allow some longitudinal viewing freedom for the observer. In particular, so long as the eyes of the observer remain in the appropriate diamond shaped viewing zones 21 and 22, the observer will perceive a 3D image across the whole of the display. However, movement in the longitudinal or Z direction causes a change of the size of the target image as the observer moves towards and away from the video camera 3. The differential method 76 uses the latest two consecutive image fields so that the target may only move a small distance. The scaling effect is therefore minimal and does not cause a serious problem.

The scaling effect is more important to the template matching steps 73 and 79 because each image field is always searched with a fixed template acquired during the template capture step 61. The result of the scaling effect is that the maximum correlation is lower than the optimum value of 1. For the specific embodiment described hereinbefore, the tracking system can tolerate longitudinal movement of about 150 millimeters forwards or backwards from the best viewing position of 0.85 meters, with a measuring error not exceeding 5 millimeters.

As described hereinbefore, a preset threshold is used in the steps 74 and 80 to test whether the target image has been located. The preset threshold has to be sufficiently small so that it can accommodate different people at different positions and orientations under various lighting conditions.

However, the threshold should be sufficiently large so that it can discriminate a true target image from a false one. Target verification may be enhanced by further checking using additional methods such as hue (H) saturation (S) value (V) measurement as illustrated in FIGS. 25 and 26.

Figure 25:
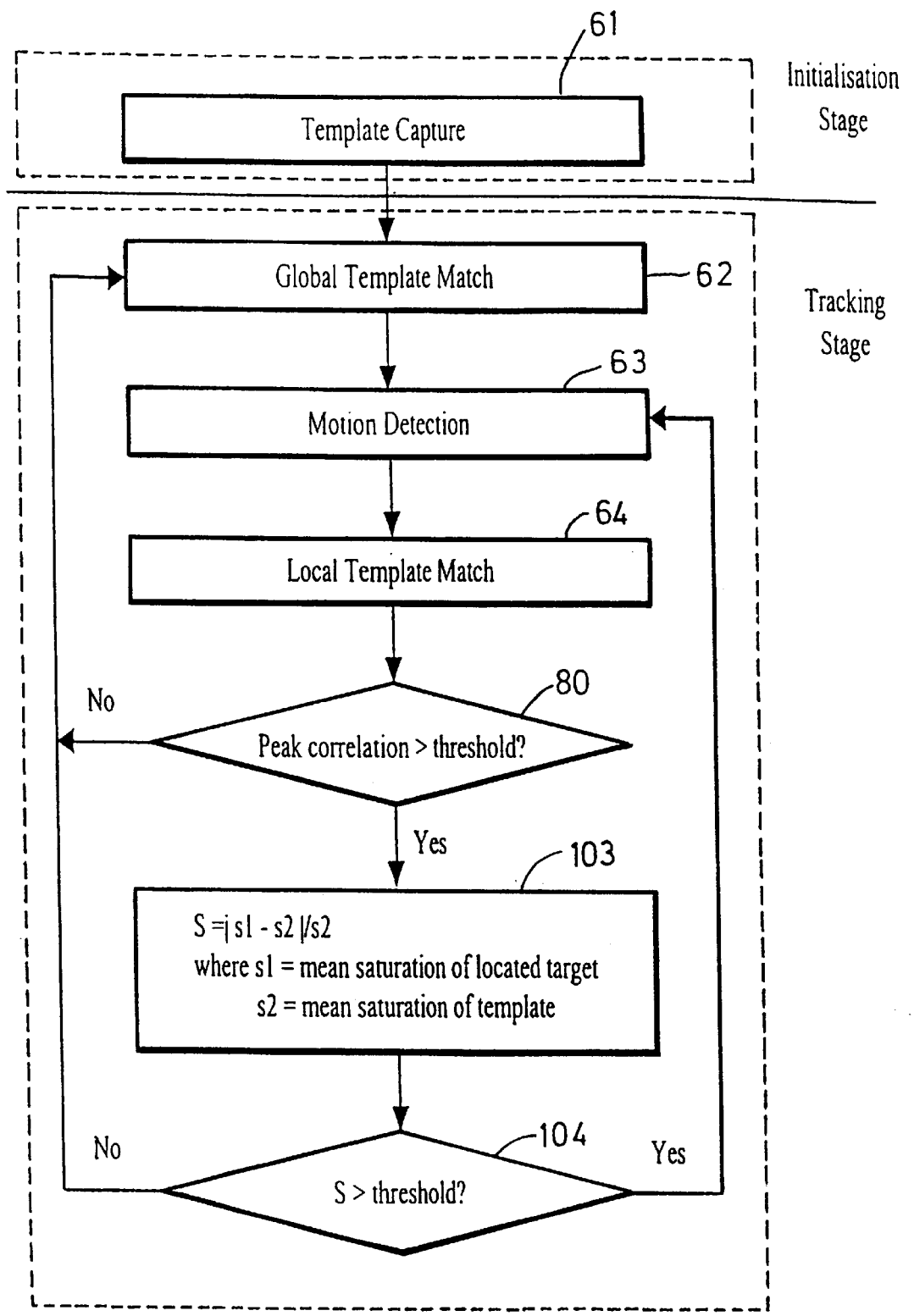
FIG. 25 illustrates an alternative technique for template matching.

The image tracking method shown in FIG. 25 differs from that shown in FIGS. 17 and 18 in that steps 103 and 104 are inserted. It is well known that human skin tends to be of uniform saturation. This uniformity is less affected by different lighting conditions than other image features, such as grey levels. With uniform illumination, both hue and saturation of the face change smoothly over a large portion of the face. Even with non-uniform illumination, the saturation of the image remains fairly balanced on both sides of the observer face whereas the intensity picture could be visibly dark on one side and bright on the other. Also, the average saturation value over the observer face region differs from that of the background more significantly. The mean value of the saturation over the observer face changes very little during head movement. This therefore provides an additional check for target verification.

Figure 26:
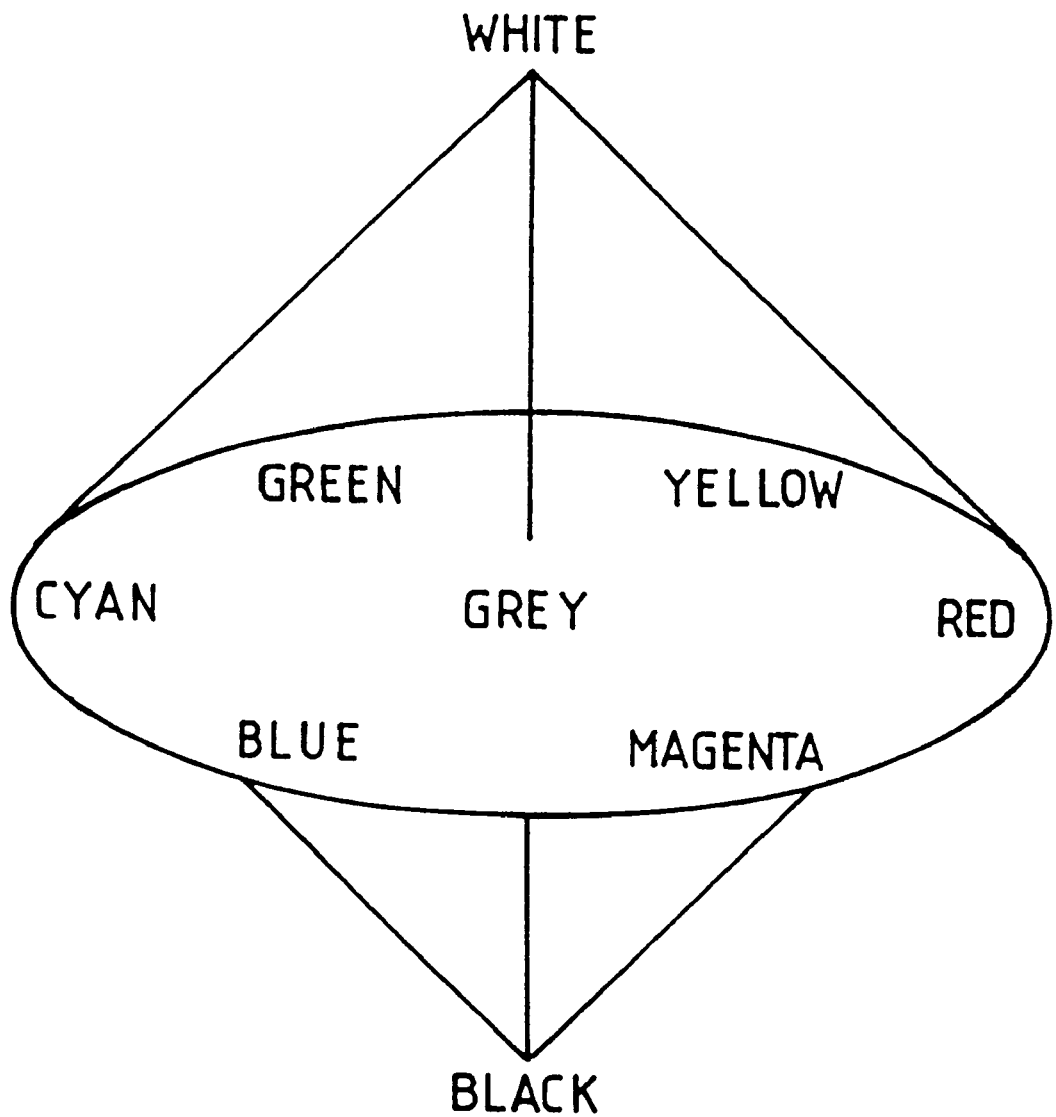
FIG. 26 is a diagram illustrating hue (H), saturation (S), value (V) space.

FIG. 26 illustrates HSV as a double cone containing all possible colours of light. The axis of the double cone represents a grey scale progression from black to white. Distance from the axis represents saturation. Angular direction around the axis represents hue.

In the case of a video camera 3 providing red, green and blue (RGB) outputs, conversion to HSV format may be obtained by finding the maximum and minimum values of the RGB signals. The V component is then given by the value of the maximum signal. The saturation S is defined as zero when the V component is zero and otherwise as the difference between the maximum and minimum RGB values divided by the maximum value. The hue is computed as follows:

$$H = \begin{cases} 0 \text{ for } V = 0 \\ (G-B)/d \text{ for } cmax = R \\ 2 + (B-R)/d \text{ for } cmax = G \\ 4 + (R-G)/d \text{ for } cmax = B \end{cases}$$

where d is the difference between the maximum and minimum RGB values and cmax is the maximum of the RGB values.

If the peak correlation value exceeds the threshold, the step 103 converts the region of the image field underlying the template at the optimum position from RGB to HSY format as described hereinbefore. The mean value sl of the target image is calculated and compared with the mean saturation of the template (which is fixed and which may be calculated during the template capture step 61). The difference S in mean saturation is calculated as $|s1-s2|/s2$ and is compared in step 104 with another predetermined threshold having a typical value between 0.7 and 0.8. If the mean saturation is greater than the threshold, control returns to the motion detection step 63 indicating that target verification has been successful. If S is less than the threshold, control returns to the global template matching step 62. This additional checking thus reduces the possibility of false locking onto an incorrect target image.

Figure 27:
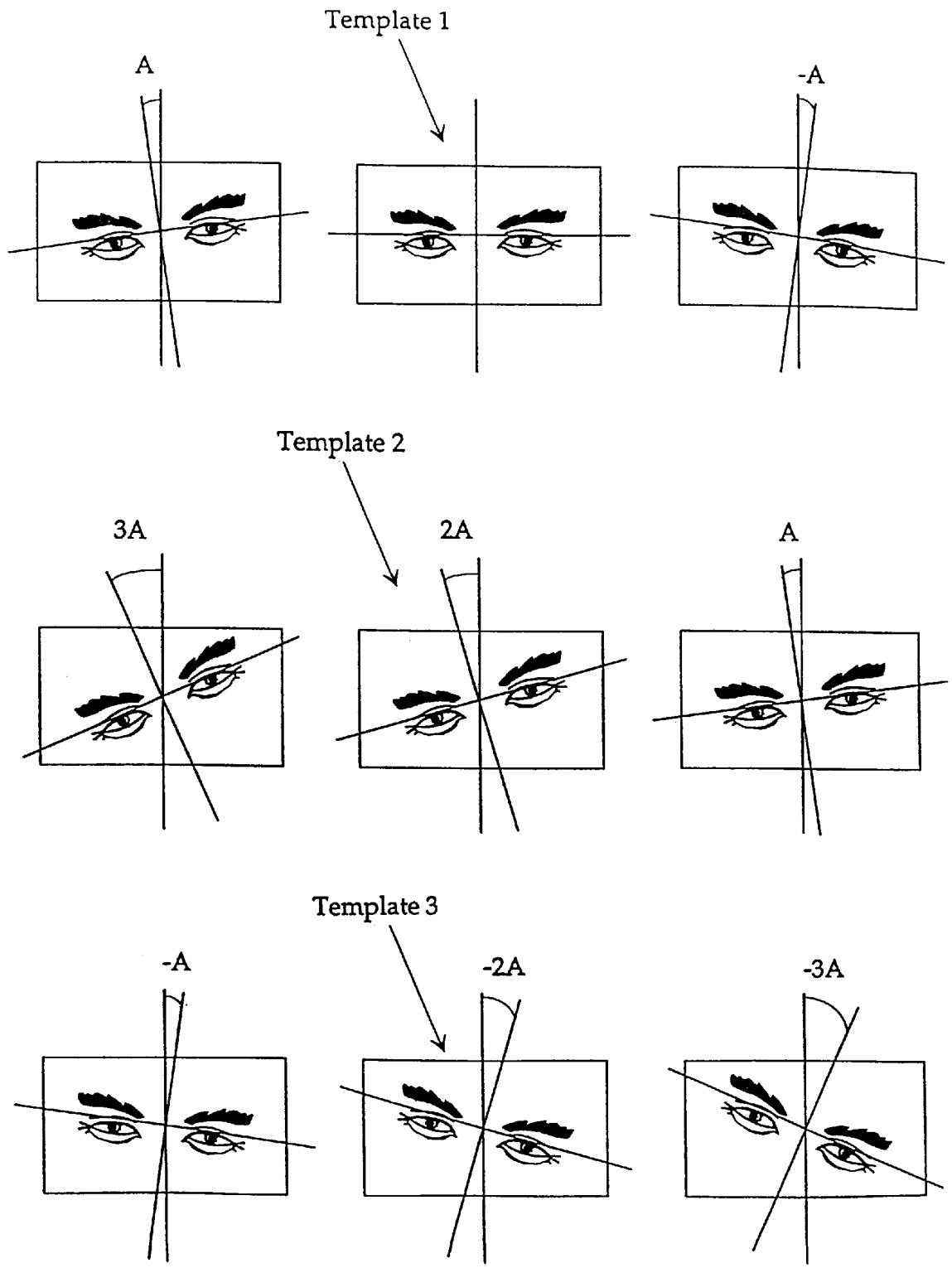
FIG. 27 illustrates multiple template techniques for accommodating head tilting.

The system described hereinbefore employs a single template for a single user whose face is assumed to be in a roughly upright position during any head movement. In practice, the user is allowed to tilt and/or rotate his head within a small amount. The exact range is different from user to user, depending on a number of factors such as the face size, the facial features and signal-to-noise ratio in the image. The system may be modified to allow a larger degree of rotation and tilting by using multiple templates. The first row of FIG. 27 illustrates the use of a single template which would allow the user to tilt from an angle of −A degrees to +A degrees. If a second template is obtained at an angle of 2A, this template may be used to match eye regions that are tilted in the range of A to 3A degrees. Similarly a third template may be obtained at an angle of −2A and extend the tilting range from −A to −3A degrees.

In this example, the first template may be used initially to find the best-matched region. If the best correlation value is above the pre-set threshold, then the eye region is found; otherwise the second template is used to apply the template matching process. If the best correlation value is above the pre-set threshold, then the eye region is found; otherwise the third template is used to apply the template matching process.

If the eye region is found using the second template, for example, then the template matching for the next frame may start with the second template rather than the first template. If the best correlation value is above the pre-set threshold, then the eye region is found; otherwise the other two templates may be used in turn until the eye region is found.

If more templates are used, then the allowed tilting range may be further extended.

The second and third templates may be obtained using the interactive method as described hereinbefore with the user keeping his head tilted to the desired degree. However, this may not be convenient and may not be necessary, as the second and third templates may be obtained computationally by rotating the first template by the desired degree.

This method may be applied to extend the range of rotation allowed for a user who rotates his head about a vertical axis, as illustrated in FIG. 28. The extra templates however have to be captured manually and individually.

The use of multiple templates increases the computing power required by a factor that is equal to the number of templates used. In order to keep the same performance, either a more powerful serial processing computer has to be used or a parallel computer may be used. This template matching process itself and the use of multiple templates are very suitable for parallel processing. In the fixture, as parallel computing becomes more readily available, such multiple template techniques may become advantageous in terms of implementation and computing efficiency.

Various modifications may be made within the scope of the invention. For instance, although much of the tracking system in the described embodiment is embodied as a programmed data processor, other implementations include the use of discrete components, for instance comprising a camera, a digital signal processing chip and a suitable store. The system may also be implemented as a special purpose silicon chip or chip set which may at least in part be built into a camera system. Such a camera may have a first output for a standard video signal and a second output for position data. A system integrated directly with the camera sensor such as a CMOS based camera system would not require digital/analogue and analogue/digital converters to generate and process analogue video data, thus providing an opportunity of reducing cost and improving performance. Also, although the use of a visible light camera has been described, other sensors such as infrared light systems may be used.

What is claimed is:

1. An image tracking system which determines a position of a target image as the position of the target image varies, the image tracking system comprising:

first means for presenting a sequence of images, second means for determining the position of the target image in a previously presented image from the first means, third means for determining movement of the target image between the previously presented image and a subsequently presented image from the first means, and fourth means for producing an output indicating the position of the target image in the subsequently presented image as the position determined by the second means modified by the movement determined by the third means, wherein the third means is arranged to determine movement at a plurality of image elements in a second image portion which is wholly within and smaller than the target image, the third means is arranged to determine translational movement of the target image, and the third means is arranged to solve a set of equations:

$$f_1(x_i,y_i)=f_2(X_i,y_i)+\Delta x \delta f_2(x_i,y_i)/\delta x+\Delta y \delta f_2(x_i,y_i)/\delta y$$

where $x_i$ and $y_i$ are Cartesian coordinates of an ith image element, i is each integer such that $1 \leq i \leq j$ and j is an integer greater than one, $f_1$ and $f_2$ are functions representing the previously and subsequently presented images and $\Delta x$ and $\Delta y$ are the Cartesian components of the movement.

2. A system as claimed in claim 1, wherein the subsequently presented image is consecutive with the previously presented image.

3. A system as claimed in claim 1, wherein the previously presented image comprises each of the images of the sequence in turn.

4. A system as claimed in claim 1, wherein the first means is arranged to present the sequence of images in real time.

5. A system as claimed in claim 4, wherein the first subsequently presented image is the currently presented image.

6. A system as claimed in claim 4, wherein the means comprises a video camera.

7. A system as claimed in claim 1, wherein the first means comprises a memory for storing the previously presented image and the subsequently presented image.

8. A system as claimed in claim 1, wherein the sequence of images comprises consecutive fields of interlaced fields.

9. A system as claimed in claim 1, wherein the second, third and fourth means comprise a programmed data processor.

10. A system as claimed in claim 1, wherein the fourth means is arranged to add the movement determined by the third means to the position determined by the second means.

11. A system as claimed in claim 1, wherein the third means is arranged to determine the movement as soon as the subsequently presented image has been presented by the first means.

12. A system as claimed in claim 11, wherein the second means is arranged to determine the position of the target image on the subsequently presented image as soon as the third means has determined the movement.

13. A system as claimed in claim 1, wherein the second means is arranged to search for the target image in a first image portion which is smaller than the images of the sequence and which includes the position indicated by the fourth means.

14. A system as claimed in claim 13, wherein the position indicated by the fourth means is substantially at the center of the first image portion.

15. An image tracking system which determines a position of a target image as the position of the target image varies, the image tracking system comprising:

first means for presenting a sequence of images, second means for determining the position of the target image in a previously presented image from the first means, third means for determining movement of the target image between the previously presented image and a subsequently presented image from the first means, and fourth means for producing an output indicating the position of the target image in the subsequently presented image as the position determined by the second means modified by the movement determined by the third means, wherein the second means is arranged to search for the target image in a first image portion which is smaller than the images of the sequence and which includes the position indicated by the fourth means, and the second means is arranged to search for the target image in the whole of the previously presented image if the search in the first image portion is unsuccessful.

16. An image tracking system which determines a position of a target image as the position of the target image varies, the image tracking system comprising:

first means for presenting a sequence of images, second means for determining the position of the target image in a previously presented image from the first means, third means for determining movement of the target image between the previously presented image and a subsequently presented image from the first means, and fourth means for producing an output indicating the position of the target image in the subsequently presented image as the position determined by the second means modified by the movement determined by the third means, wherein the second means is arranged to search for the target image in a first image portion which is smaller than the images of the sequence and which includes the position indicated by the fourth means, and the second means is arranged to search for the target image in the whole of an initial previously presented image.

17. A System as claimed in claim 13, wherein the second means is arranged to perform template matching of the target image at a plurality of first positions in the first image portion to find the best match.

18. An image tracking system which determines a position of a target image as the position of the target image varies, the image tracking system comprising:

first means for presenting a sequence of images, second means for determining the position of the target image in a previously presented image from the first means, third means for determining movement of the target image between the previously presented image and a subsequently presented image from the first means, and fourth means for producing an output indicating the position of the target image in the subsequently presented image as the position determined by the second means modified by the movement determined by the third means, wherein the second means is arranged to search for the target image in a first image portion which is smaller than the images of the sequence and which includes the position indicated by the fourth means, the second means is arranged to perform template matching of the target image at a plurality of first positions in the first image portion to find the best match, and the second means is arranged to perform template matching of the target image at a plurality of second positions which are more finely spaced than the first positions and which are disposed adjacent a position corresponding to the best match.

19. An image tracking system which determines a position of a target image as the position of the target image varies, the image tracking system comprising:

first means for presenting a sequence of images, second means for determining the position of the target image in a previously presented image from the first means, third means for determining movement of the target image between the previously presented image and a subsequently presented image from the first means, and fourth means for producing an output indicating the position of the target image in the subsequently presented image as the position determined by the second means modified by the movement determined by the third means, wherein the second means is arranged to search for the target image in a first image portion which is smaller than the images of the sequence and which includes the position indicated by the fourth means, the second means is arranged to perform template matching of the target image at a plurality of first positions in the first image portion to find the best match, and the second means is arranged to perform a correlation between the target image and a region corresponding to the first position and a correlation between the target image and a region corresponding to the second position and to select the highest correlation.

20. A system as claimed in claim 19, wherein the second means is arranged to compare the highest correlation with a threshold for acceptability.

21. A system as claimed in claim 1, further comprising fifth means for capturing the target image by storing a portion of one of the images of the sequence.

22. A system as claimed in claim 21, wherein the fifth means comprises a display for displaying the sequence of images, an image generator for generating a border image on the display, and a user operable control for actuating capture of an image region within the border image.

23. A system as claimed in claim 22, wherein the fifth means comprises a further user operable control for controlling the position of the border image on the display.

24. A system as claimed in claim 1, wherein the third means is arranged to determine movement at a plurality of image elements in a second image portion which is wholly within and smaller than the target image.

25. A system as claimed in claim 24, wherein the third means is arranged to determine translational movement of the target image.

26. An observer tracking autostereoscopic display including a system as claimed in claim 1.

27. A display as claimed in claim 26, wherein the first means comprises a video camera disposed at an optical center of the display.

28. An image tracking method for sequentially presented images, comprising determining the position of a target image in a previously presented image, determining movement of the target image between the previously presented image and a subsequently presented image, and indicating the position of the target image in the subsequently presented image as the position in the previously presented image modified by the determined movement wherein the step of determining movement comprises the steps of determining movement at a plurality of image elements in a second image portion which is wholly within and smaller than the target image, determining translational movement of the target image, and solving a set of equations:

$$f_1(x_i, y_i) = f_2(x_i, y_i) + \Delta x \delta f_2(x_i, y_i)/\delta x + \Delta y \delta f_2(x_i, y_i)/\delta y$$

where $x_i$ and $y_i$ are Cartesian coordinates of an ith image element, i is each integer such that $1 \leq i \leq j$ and j is an integer greater than one, $f_1$ and $f_2$ are functions representing the previously and subsequently presented images and $\Delta x$ and $\Delta y$ are the Cartesian components of the movement.

* * * * *